United States Patent [19]

Brown

[11] 3,922,594
[45] Nov. 25, 1975

[54] CONTROL SYSTEM FOR PHASE DISPLACEMENT REGULATOR CIRCUITS

[75] Inventor: Harold J. Brown, Lorain, Ohio

[73] Assignee: Lorain Products Corporation, Lorain, Ohio

[22] Filed: Oct. 15, 1974

[21] Appl. No.: 514,849

[52] U.S. Cl. .................... 321/5; 321/18; 321/19; 321/20; 323/119
[51] Int. Cl.² ............................... H02M 7/12
[58] Field of Search ............. 321/5, 18, 19, 20, 21; 323/119

[56] References Cited
UNITED STATES PATENTS

| | | | |
|---|---|---|---|
| 3,466,525 | 9/1969 | Ainsworth | 321/5 |
| 3,525,035 | 8/1970 | Kakalec | 323/61 |
| 3,538,412 | 11/1970 | Graf et al. | 321/5 X |
| 3,576,443 | 4/1971 | Brown | 307/12 |
| 3,605,003 | 9/1971 | Guggi | 321/20 |
| 3,725,766 | 4/1973 | Brown | 321/5 |
| 3,745,437 | 7/1973 | Brown | 323/119 X |
| 3,824,443 | 7/1974 | Brown | 321/20 X |
| 3,876,922 | 4/1975 | Forstbauer | 321/20 X |

*Primary Examiner*—William M. Shoop
*Attorney, Agent, or Firm*—Edward C. Jason

[57] ABSTRACT

A control circuit for a regulator circuit of the type in which the regulator output voltage and current are dependent upon the phase angle between an unregulated a-c input voltage wave and a regulating or control voltage wave. The control circuit generates a reference signal that is locked in phase with the a-c input voltage wave and a control signal that is locked in phase with the control voltage wave. Output voltage sensing circuitry is arranged to increase or decrease the phase angle between the control signal and the reference signal, as required, to maintain the output voltage of the regulator at the desired, regulated value. A phase difference limiting network allows the control signal to vary freely in phase with respect to the reference signal so long as the control signal remains within an angular window of from 0° to 60° of lag behind the reference signal and assures that limits of this angular window cannot be exceeded. A damping signal is utilized to assure that the rate of change of the phase angle between the control and reference signal is limited in a manner which affords both high control system stability and rapid dynamic response to changes in input voltage and output current. OR-ing circuitry is also provided to allow the output current to reduce the regulator output voltage and thereby limit the regulator output current to a safe value when the output current attempts to rise beyond its highest rated value.

76 Claims, 19 Drawing Figures

FIG.1

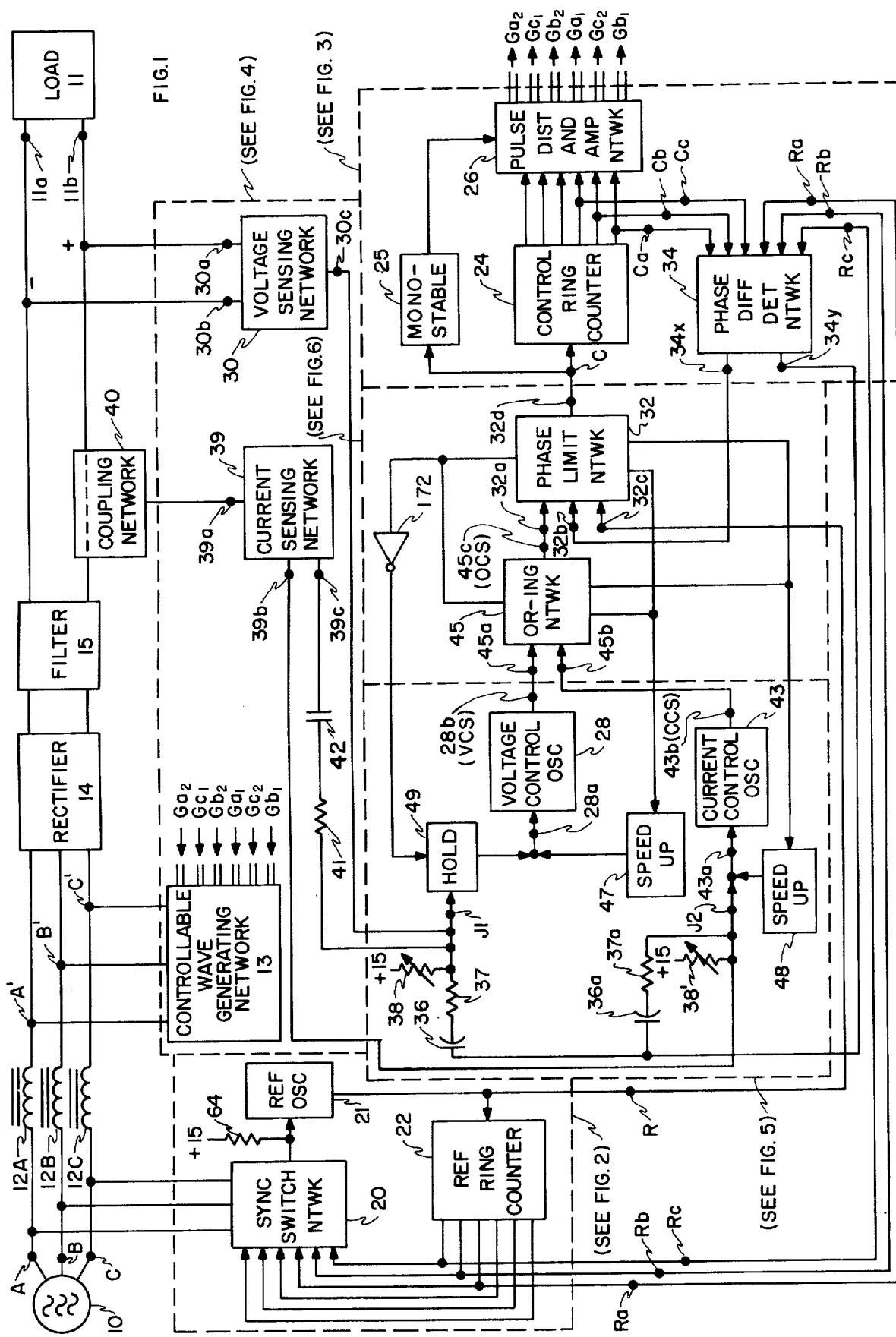

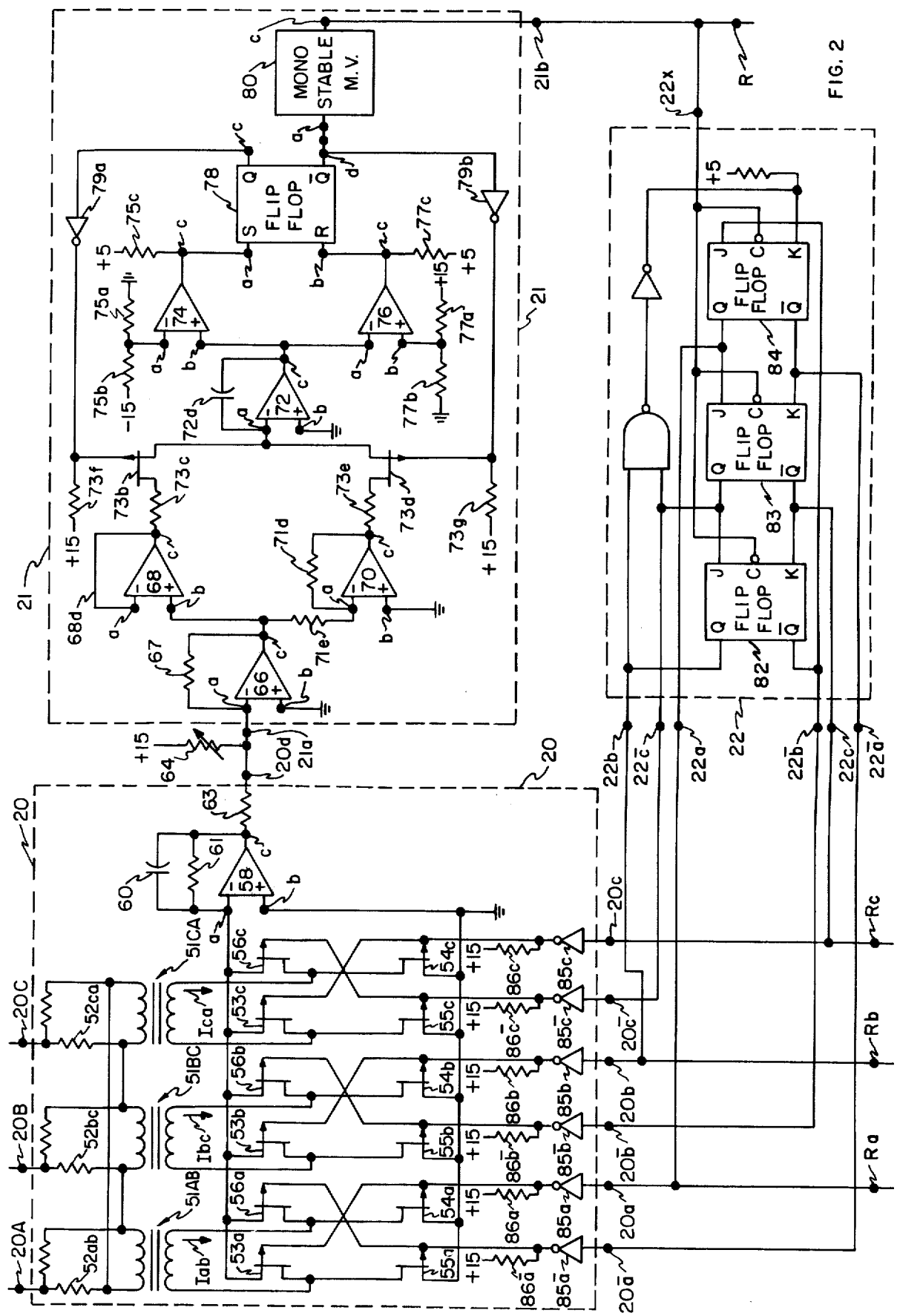

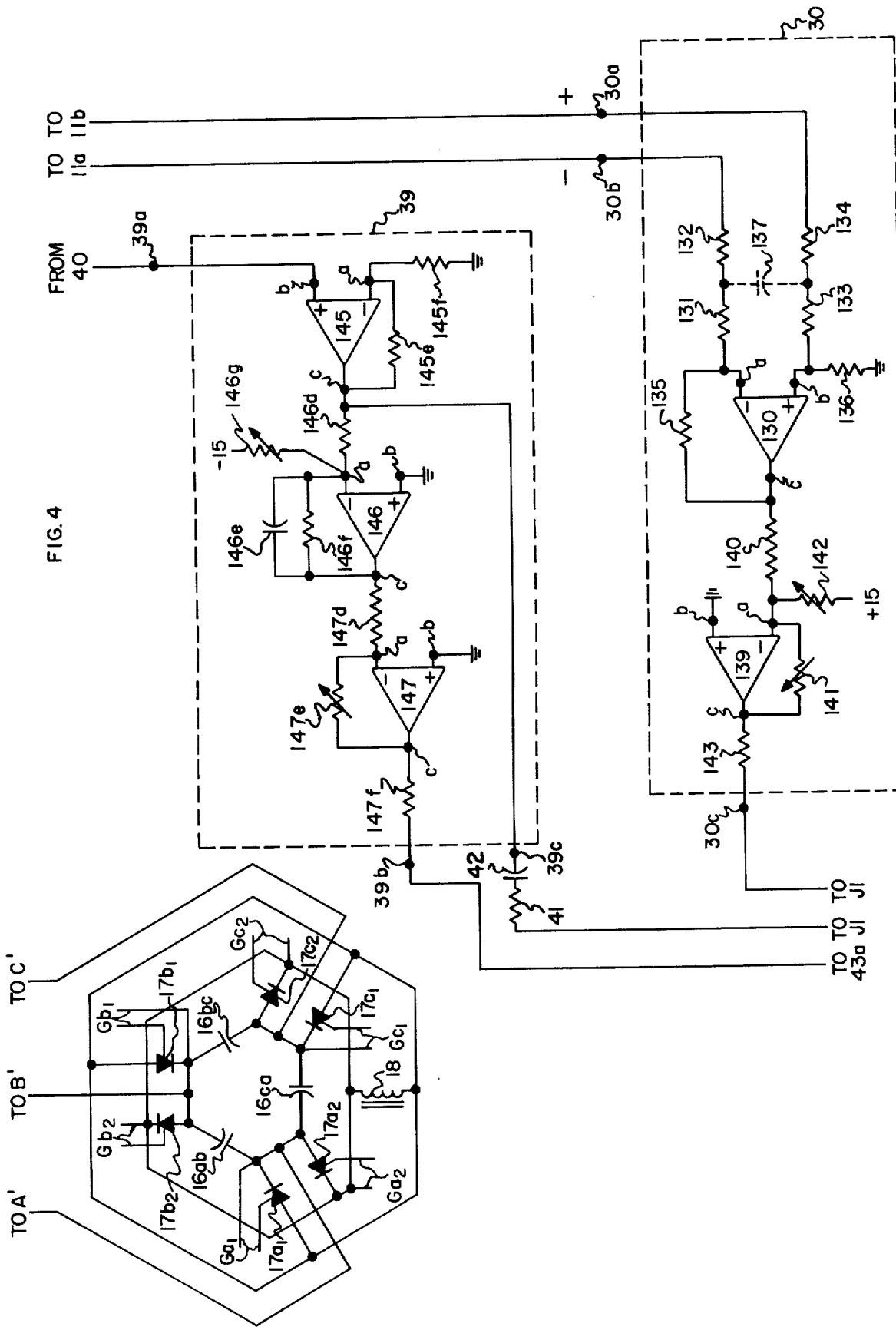

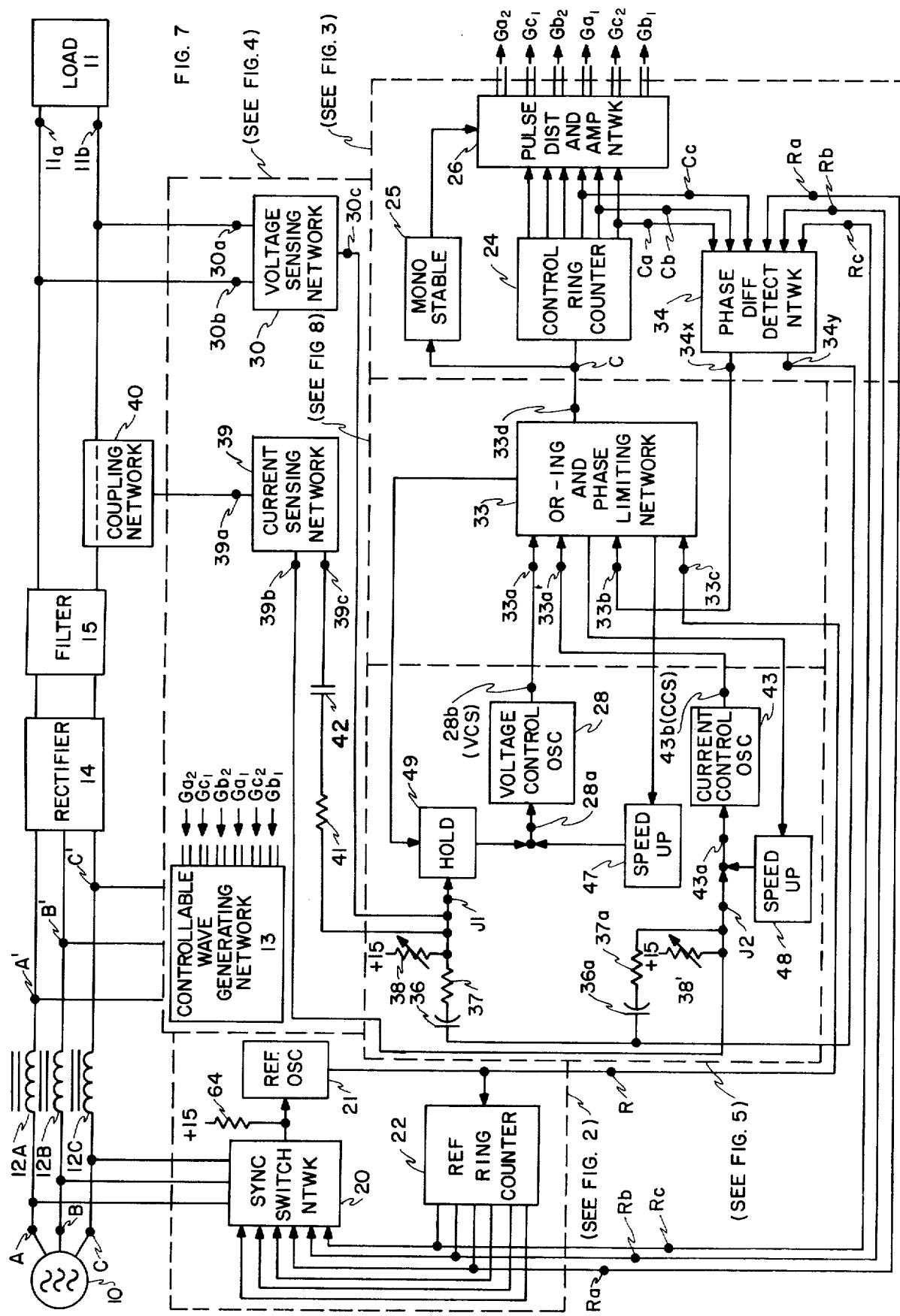

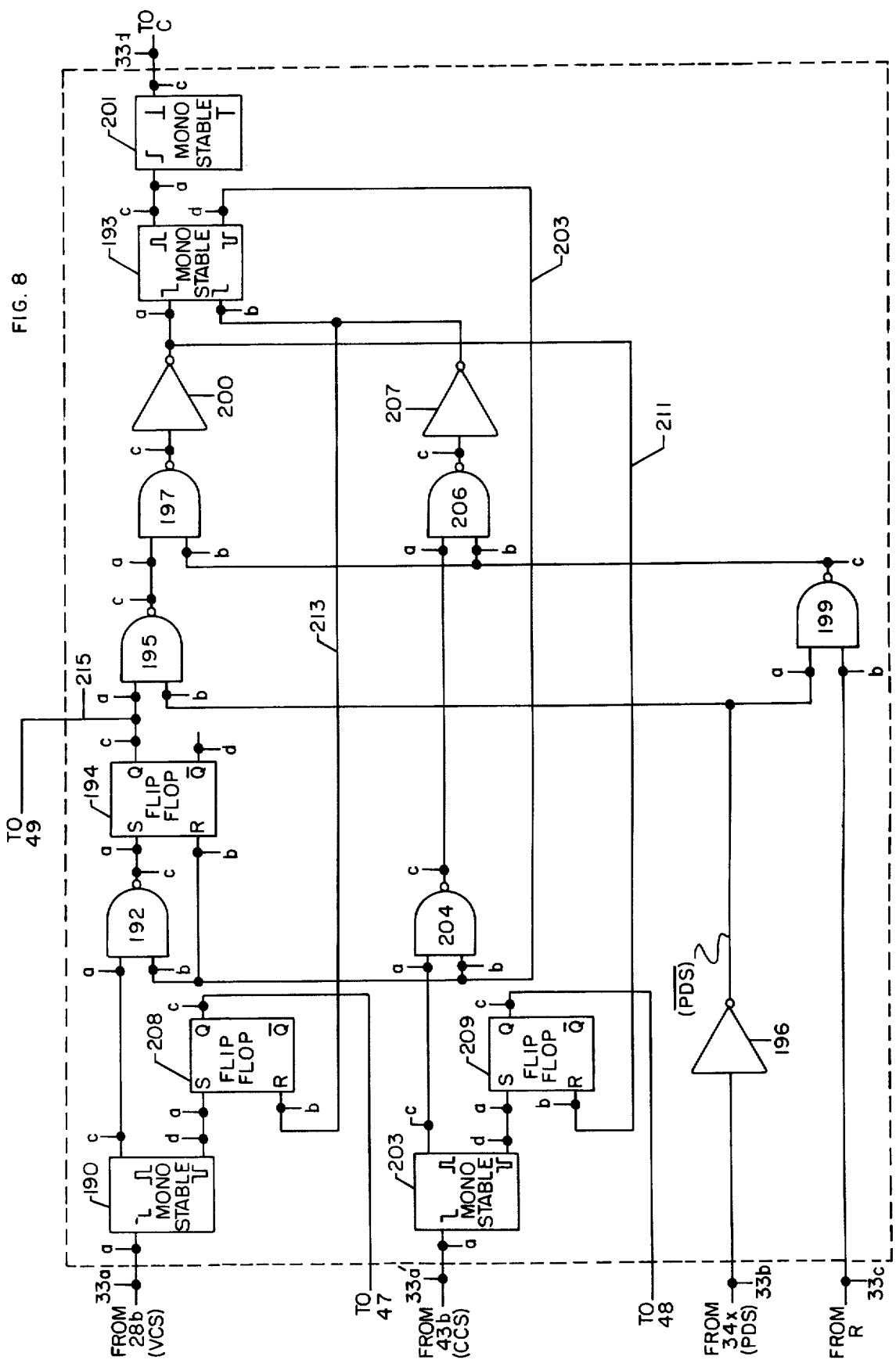

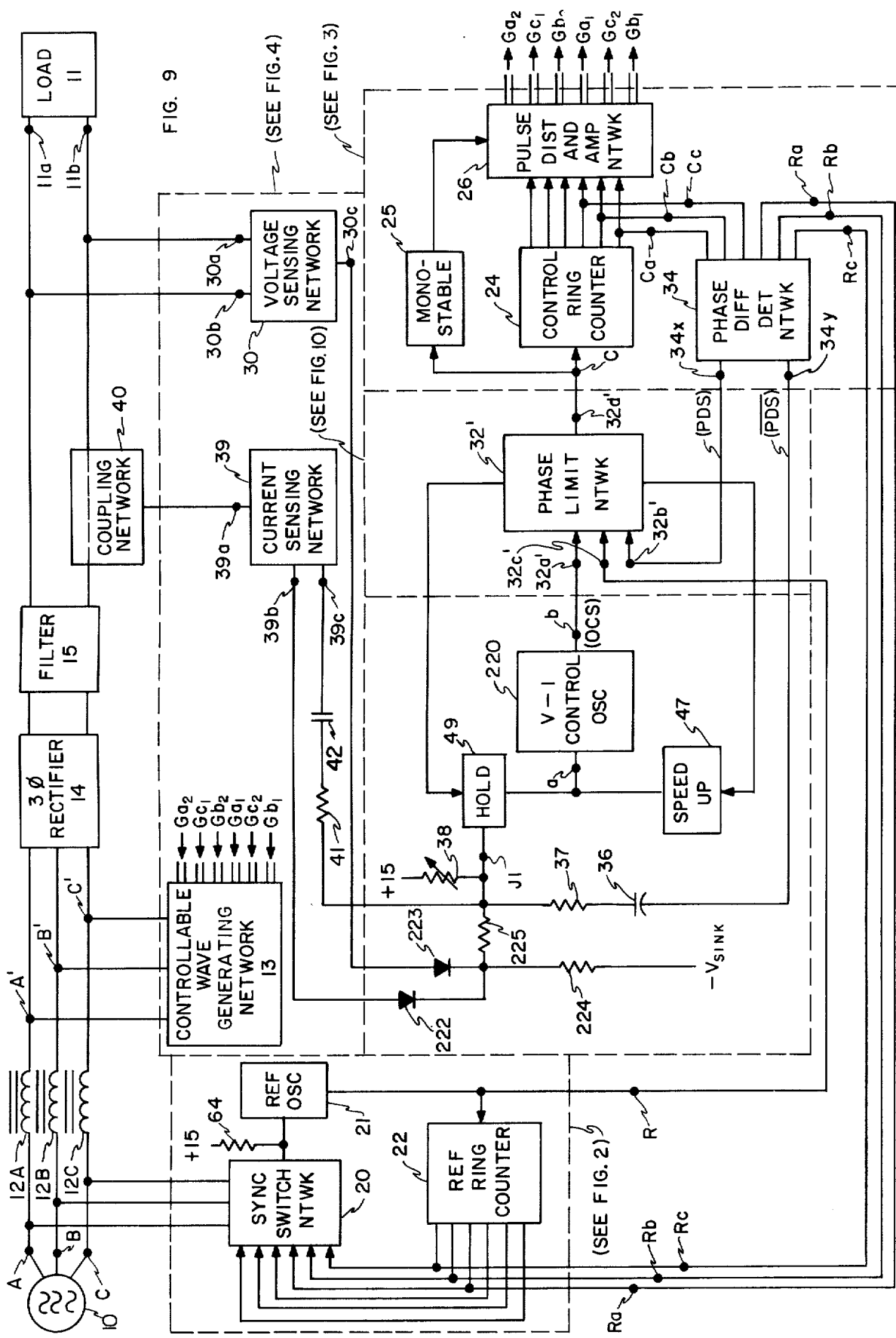

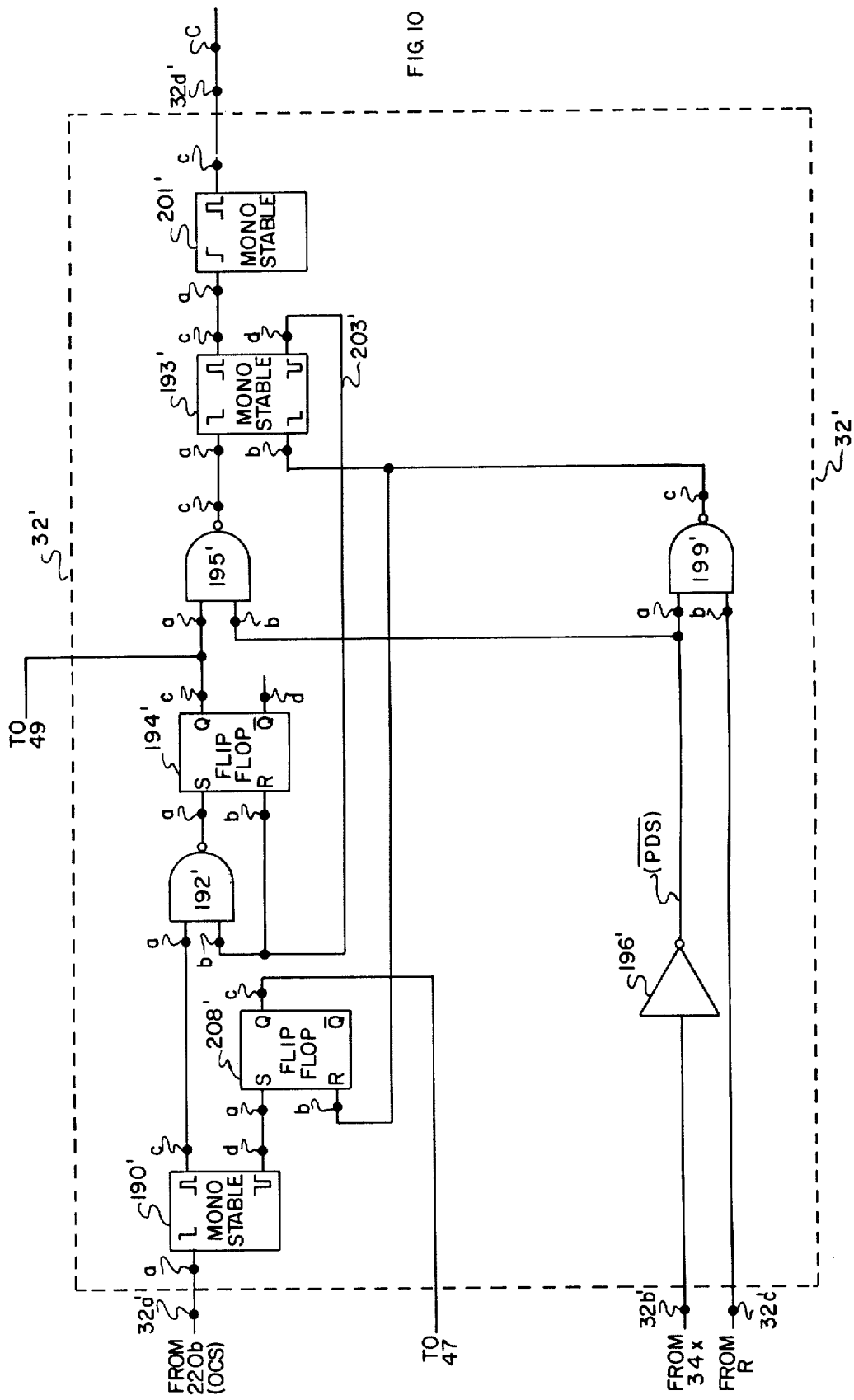

CONTROL SYSTEM FOR PHASE DISPLACEMENT REGULATOR CIRCUITS

BACKGROUND OF THE INVENTION

The present invention relates to control circuits for voltage regulator circuits having an a-c input voltage and an a-c or d-c output voltage and is directed more particularly to regulator circuits of this type wherein regulation is accomplished by controlling the phase angle between an a-c input voltage wave and an a-c control voltage wave.

Among the various classes of circuits which may be utilized to provide a regulated a-c or d-c output voltage from an unregulated a-c input voltage is the class of "phase-displacement" regulators. Each member of this class of regulators includes an inductance, connected between the a-c input terminals and the regulator output terminals, to support the difference between the unregulated a-c input voltage and the regulated a-c or d-c output voltage. Each member of this class of regulators also includes a controllable wave generating network for applying to the load side of the inductance a control voltage wave which is synthesized from current drawn from the a-c input. In such regulator circuits voltage regulation is accomplished by controlling the phase angle $\phi$ between the a-c input voltage wave and the control voltage wave and thereby controlling the voltage and current which the a-c input voltage source applies to the a-c or d-c load through the inductance.

Regulator circuits of the phase-displacement type may be classified on the basis of the circuitry utilized to synthesize the required control voltage wave. In the U.S. Pat. of H. J. Brown, U.S. Pat. No. 3,576,443, entitled "AC and DC Voltage Regulator Circuit," issued on Apr. 27, 1971, the regulating wave is synthesized by means of an inverter which draws its operating power from the source of a-c input voltage. In regulators commonly known as controlled ferroresonant regulators, one example of which is shown in the U.S. Pat. of R. J. Kakalec, U.S. Pat. No. 3,525,035, entitled "Closed Loop Ferroresonant Voltage Regulator Which Simulates Core Saturation," issued on Aug. 18, 1970, the regulating voltage wave is synthesized by means of the resonant charging and discharging of a capacitor through a linear inductor and an SCR or a triac. Other examples of phase-displacement regulators may be found in the U.S. Pat. of H. J. Brown, U.S. Pat. No. 3,824,443, entitled "Regulator Circuit Having A Clamped Regulating Wave," issued on July 16, 1974, and in the U.S. Pat. of H. J. Brown, U.S. Pat. No. 3,745,437, entitled "Regulator Having A Multi-Stepped Regulating Wave," issued on July 10, 1973.

While the above described class of regulator circuits has numerous advantages such as high circuit efficiency, simplicity of construction, and a desirable input current waveform, such circuits have been beset by numerous control problems. One such problem has been accurately controlling the regulated output voltage in the presence of normally occurring variations in the frequency of the a-c input voltage. In the absence of circuitry for compensating for such input frequency variations, the regulated output voltage will vary proportionally with variations in the a-c input voltage frequency. Since commercial a-c power can, in the short term, be relied upon only to be accurate within plus or minus two hertz, impermissible variations in the regulated output voltage can easily occur.

Another problem in utilizing phase displacement regulators is that the control voltage wave must be prevented from leading the a-c input voltage wave. This is because such a leading condition causes the regulator circuit to deliver power to rather than to receive power from the a-c line. This delivery of power to the line rapidly causes a depletion of the stored energy from which the control wave is synthesized and results in a collapse of the regulated output voltage. A related problem is that the control voltage wave must be prevented from lagging the a-c input voltage wave by more than 90°, the angle at which maximum load power is delivered. In practice, however, a maximum of 60° of lag is preferable since, beyond 60°, only a relatively small increase in load power is obtainable at the expense of a relatively large worsening of the a-c input power factor. The imposition of these angular limits is made more difficult by the fact that these angular limits must be maintained in the presence of a variable a-c input voltage frequency.

Still another problem in controlling phase displacement regulators is that, within the above described angular limits, the phase or control angle $\phi$ by which the control voltage wave lags the input voltage wave must be free to assume any value called for by the voltage and current requirements of the load. Thus, the phase angle between the control voltage wave and the input voltage wave must be freely variable within the above angular limits and yet be incapable of exceeding those limits.

Another problem in controlling phase displacement regulators is the problem of providing a current limiting characterisitic, that is, a characteristic whereby the load current is limited and the output voltage is reduced when the output current rises beyond its rated value. The problem of providing such current limiting is compounded by the fact that it must be provided in the presence of the previously described control characteristics.

A control system for phase displacement regulators must also satisfactorily deal with the problems of providing highly accurate output voltage regulation, good system stability, and good dynamic response. More specifically, a control system must accurately maintain the preset output voltage, must be stable with respect to sudden changes in input voltage, output current and other normally occurring circuit disturbances, and must provide an output voltage which returns to its regulated value within a relatively short time after sudden changes in input voltage or output current.

SUMMARY OF THE INVENTION

In accordance with the present invention, there is provided improved circuitry for controlling the operative characteristics of phase-displacement type voltage regulator circuits.

One respect in which the control circuitry of the invention comprises an improvement over previously available control circuits is that it maintains the regulator output voltage at the desired value, without regard to input frequency variations, over a wide range of input frequencies, without utilizing circuitry that requires the matching of component values and without utilizing analog control signals which must track one another.

Another respect in which the present control circuitry comprises an improvement over earlier control circuits is that it imposes definite angular limits on the phase angle between the control voltage wave and the a-c input voltage wave and yet allows that phase angle to vary within those limits, as required, to supply the voltage and current required by the load. In addition, these angular limits are imposed in a manner which allows them to be maintained in the presence of changes in the input frequency. In other words, the control circuitry will cause the control voltage wave to remain within the same number of degrees of the a-c input voltage wave over a wide range of a-c input voltage frequencies.

Another respect in which the control circuitry of the invention comprises an improvement over earlier control circuits is that it utilizes a damping signal whereby the rate of change of the phase angle between the a-c input voltage wave and the control voltage wave is limited. Furthermore, this damping signal is generated, in accordance with the phase angle between signals representative of the a-c input and control voltage waveforms, so as to substantially immediately reflect changes in the latter phase angle.

Still another respect in which the present control circuit comprises an improvement over earlier control circuits is the absence of lead and/or lag networks of the type typically used to stabilize feedback control systems. The elimination of such networks not only simplifies the control circuitry, but also improves the output voltage accuracy and the dynamic response of the regulator circuit as a whole. Thus, a regulator circuit constructed in accordance with the invention will not only regulate more accurately than prior regulators of similar rating, but will restore the output voltage to the regulated value, after a sudden change in input voltage or output current, more rapidly than those prior voltage regulators.

Another respect in which the control circuit of the invention comprises an improvement over prior control circuits is the provision of improved current limiting circuitry whereby the load current is limited and the load voltage is reduced when the regulator output current exceeds its maximum rated value. Furthermore, this current limiting circuitry operates in the presence of and without disturbing the previously described frequency correcting, phase limiting and damping circuitry.

It will be understood that the control circuitry of the invention includes numerous other improvements over prior control circuits and that these improvements will be discussed more fully later in connection with the circuitry necessary to make those improvements more readily understandable.

DESCRIPTION OF THE DRAWINGS

FIG. 1 is a block diagram of one embodiment of the control system of the invention, FIGS. 2 through 6 show schematic diagrams of the sections of the control system of FIG. 1 which are enclosed in dotted lines in FIG. 1, FIG. 7 is a block diagram of another embodiment of the control system of the invention, FIG. 8 is a schematic diagram of one of the sections of the control system of FIG. 7, FIG. 9 is a block diagram of still another embodiment of the invention, FIG. 10 is a schematic diagram of one of the sections of the control system of FIG. 9, FIGS. 2a through 6a show the time relationships of various voltages appearing in the circuits of FIGS. 2 through 10, Each of the sections of each of the above block diagrams which is enclosed in dotted lines is labeled with a reference to the Figure showing the schematic drawing of that section.

DESCRIPTION OF THE PREFERRED EMBODIMENTS

Figure 2E:
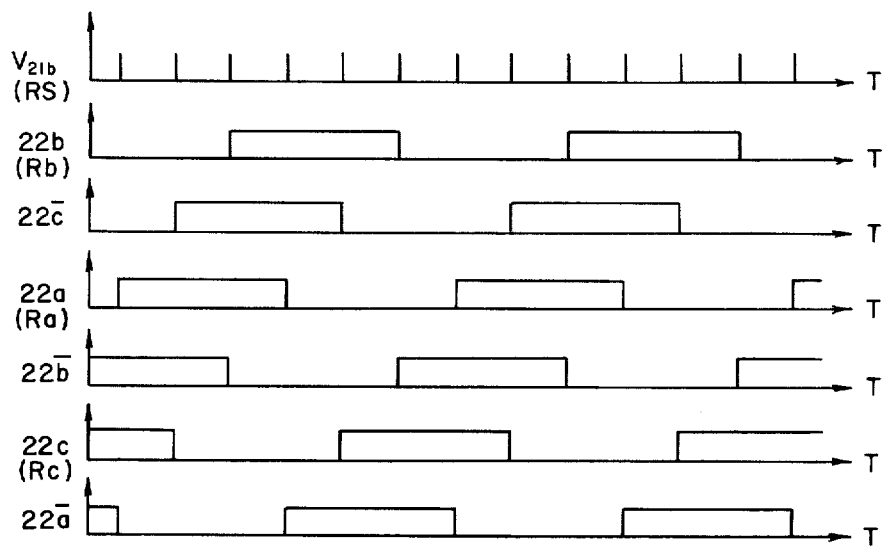

Referring to FIG. 1, there is shown an unregulated three phase a-c source 10 for supplying voltage and current to a d-c load 11 through the regulator circuit of the invention. In the emodiment of FIG. 1, the power-handling portion of the regulator circuit includes inductances 12A, 12B and 12C which serve to support the difference between the unregulated a-c voltages at a-c input terminals A, B and C and the regulated d-c output voltage at load terminals 11a and 11b. These three inductances may comprise separate windings located on a single or common core structure. The power-handling portion of FIG. 1 also includes a controllable wave generating network 13 for applying to terminals A', B' and C' control voltage waves which, together with the input voltage waves at terminals A, B and C, control the flow of power from source 10 to load 11 in accordance with the phase or control angle $\phi$ by which the control voltage waves at terminals A', B' and C' lag the corresponding a-c input voltage waves at terminals A, B and C. Finally, the power handling portion of FIG. 1 includes a suitable three phase rectifier 14 for generating a d-c voltage from the three phase voltages at terminals A', B' and C' and a suitable filter network 15 for smoothing the d-c voltage established by rectifier 14. It will be understood that if an a-c rather than a d-c load is to be energized from source 10, rectifier network 14 may be eliminated and the a-c load may be energized directly from terminals A', B' and C' through any suitable a-c filter network, provided that any suitable a-c output voltage error sensing network is substituted for the d-c output voltage error sensing network described herein.

In order that the phase angle $\phi$ may be varied, as required, to maintain the a-c voltages at terminals A', B' and C' and the d-c voltage at terminals 11a and 11b at the desired, regulated values, controllable wave generator 13 is provided with control inputs $Ga_1$, $Ga_2$, $Gb_1$, $Gb_2$, $Gc_1$ and $Gc_2$ through which are applied gating signals that determine the phase position of the control waves with respect to the input voltage waves. In the present illustrative embodiment, as shown in FIG. 4, controllable wave generator 13 includes delta-connected capacitors 16ab, 16bc and 16ca, a plurality of SCR switches $17a_1$, $17a_2$, $17b_1$, $17b_2$, $17c_1$ and $17c_2$ and an inductor 18. Switches $17a_1$ through $17c_2$ and inductor 18 serve to redistribute charge among capacitors 16ab, 16bc and 16ca in a predetermined, recurring sequence to generate between terminals A', B' and C' control voltage waves of the desired waveform and phase position. A detailed description of the manner in which the timed application of gating signals to generator inputs $Ga_1$ through $Gc_2$ results in the generation of control voltage waves may be found in the aforementioned patent of H. J. Brown, U. S. Pat. No. 3,745,437, entitled "Regulating Circuit Having Multi-Stepped Regulating Waves," the disclosure of which is hereby expressly incorporated herein by reference. It will, however, be understood that the function of controllable wave generator 13 may be served by any suitable wave generating circuit, including those described in the aforementioned U.S. Pat., Nos. 3,576,443 and 3,824,443.

As previously described, the a-c and/or d-c voltage provided by the circuit of FIG. 1 is requlated by controlling the times at which gating signals are applied to controllable wave generator inputs $Ga_1$ through $Gc_2$. It is the circuitry which controls the generation and application of these gating signals which forms the subject matter of the present application. In order to conveniently distinguish between the power-handling and control portions of the circuit of FIG. 1, the former will hereinafter be referred to as the phase responsive regulating circuitry and the latter as the phase control circuitry.

THE CONTROL CIRCUITRY OF FIG. 1

Generally speaking, the phase control circuitry of the invention operates upon and through the relationship of a periodic reference signal which is locked in phase with the a-c input voltage waves and a periodic control signal which initiates the transitions of and is, therefore, locked in phase with the control voltage waves. Because each of these signals is locked in phase with the respective voltage waves, it will be seen that, as the phase control circuitry changes the relationship between the reference and control signals, corresponding changes occur in the relationship of the input voltage waves and the control voltage waves. If, for example, the phase control circuitry limits the rate of change of the phase angle between the reference and control signals, the rate of change of the phase angle between the input voltage waves and the control voltage waves will be similarly limited. Similarly, if the phase control circuitry sets limits on the phase angle between the reference and the control signals, the phase angle between the input voltage waves and the control voltage waves will remain within similar angular limits. Thus, the relationships which the phase control circuitry imposes on the reference and control signals at a low power level are reflected by similar relationships between the input and control voltage waves at a high power level.

In the circuit of FIG. 1, the reference signal comprises a reference pulse train comprising a series of reference pulses. Each of these reference pulses may also be considered to be a pair of transitions of the reference signal of which it forms a part. Because of the equivalence of these views of the reference signal, however, language stemming from one view will be used interchangeably with language stemming from the other, depending upon which is more convenient. Since, in the present embodiment, six such reference pulses are produced for each complete cycle of the input voltage, it will be seen that the significant or activity initiating transition of each reference pulse is separated from the corresponding transition of the preceeding and following reference pulse by 60° of the input voltage. This 60° relationship is maintained in spite of changes in the input voltage frequency by a phase-lock loop including a synchronous switching network 20, a reference signal generating network or reference oscillator 21 and a reference ring counter 22. The reference signal RS produced by this phase-lock loop appears at junction R.

In the circuit of FIG. 1, the control signal comprises a control pulse train made up of a succession of control pulses, i.e., a succession of pairs of transitions, the significant transitions of which are, under steady state conditions, separated by 60° of the a-c input voltage. This control signal CS appears at a junction C and is locked in phase with the control waves established by wave generator 13 by virtue of the fact that the control pulses initiate the transitions of the control waves through the action of a control ring counter 24 and a monostable multivibrator 25 on a pulse distributor and amplifier network 26.

While reference signal RS is locked in phase with the a-c input voltage waves, and while control signal CS is locked in phase with the control voltage waves, the relationship between the reference and control signals depends upon the regulator output voltage and current, the regulator input frequency and time. Under normal operating conditions, when the output voltage and current of the regulator circuit are within rated limits and the control angle $\phi$ by which control signal CS lags reference signal RS is within the desired angular limits, the size of angle $\phi$ is fixed in accordance with the output voltage and current of the regulator circuit. The latter variables influence the size of angle $\phi$ via a voltage control signal (VCS) which is generated by a voltage control signal generator or voltage oscillator 28 and which comprises a train of voltage control pulses having a period dependent upon the regulator output voltage; and via a current control signal (CCS) which is generated by a current control signal generator or current oscillator 43 and which comprises a train of current control pulses having a period dependent upon the regulator output current. As used herein, a term such as "the angle between two pulse trains" will be understood to mean the number of input voltage degrees between a pulse or transition of one pulse train and the corresponding pulse or transition of the other pulse train.

To the end that control pulse train CS may be maintained within a predetermined angular range with respect to reference pulse train RS, i.e., to the end that each control pulse may occur substantially within an angular reference window bounded by 0° to 60° of lag behind the nearest preceeding reference pulse, there is provided in FIG. 1 a phase limiting network 32 which is connected between oscillators 28 and 43 and junction C. Limiting network 32 allows the first occurring one of the oscillator control pulses VCS or CCS to initiate a control pulse at junction C unless it is known that the control pulse so initiated will occur outside of the above described angular reference window, i.e., will not occur between the reference pulses which normally preceed and normally follow each control pulse at junction C. Thus, limiting network 32 allows the first occurring one of the oscillator control pulses to fix the phase position of control signal CS when that oscillator control pulse bears the desired phase relationship to reference signal RS.

Limiting network 32 also allows the reference signal to initiate a control pulse at junction C when the first occurring one of those oscillator control pulses does not bear the desired phase relationship to the reference signal. In initiating control pulses in accordance with the reference signal, limiting network 32 will do so either because the first occurring oscillator control pulse occurs prior to the normally preceeding reference pulse or because the first occurring oscillator control pulse attempts to occur after the normally following reference pulse, i.e., prior to the transition of the reference signal comprising the leading edge of the angular reference window or after the transition of the reference signal comprising the trailing edge of the angular reference window.

In order to allow phase limiting network 32 to determine, whether control in accordance with the reference signal is necessary because an oscillator control signal occurred too soon to fall within the desired angular limits or too late to fall within the desired angular limits, there is provided a phase difference detecting network 34 having a plurality of inputs connected to selected outputs of control ring counter 24, having a plurality of inputs connected to selected outputs of reference ring counter 22 and having an output 34x connected to phase limiting network 32. In the present embodiment, the signal appearing at detector output 34x is a two-state phase difference signal PDS which is sent to its high state by a selected transition of the control signal and which is sent to its low state by a selected transition of the reference signal.

As previously described, it is desirable that a limit be placed on the rate of change in the angle $\phi$ by which the control signal lags the reference signal. Since, in addition, each control pulse at C must occur (in time) substantially within a respective one of the reference windows defined by respective pairs of pulses of the reference signal, it is desirable that the circuitry which limits the rate of change of angle $\phi$ have no steady-state effect on the period of the control signal at C. In accordance with the present invention, the rate of change of angle $\phi$ is limited, without interfering with the desired limits on angle $\phi$, by applying to oscillator 28, through an a-c coupling network including a capacitor 36 and a resistor 37, and by applying to oscillator 43, through an a-c coupling network 36a –37a, a damping signal which varies in accordance with angle $\phi$. Because of the a-c character of these coupling networks, the damping signal has no steady-state d-c component and, therefore, has no steady-state effect on the period of the voltage control signal generated by oscillator 28 or the current control signal generated by oscillator 43. It will be understood, however, that the absence of an effective d-c component in the damping signal does not prevent that signal from inhibiting sudden, transient changes in the periods of oscillators 28 and 43, i.e., sudden changes in the phase angles between signals VCS and CCS adn reference signal RS.

To the end that the circuit of FIG. 1 may exhibit a current limiting characteristic, voltage and current oscillators 28 and 43 are chosen to be structurally similar and are arranged to have a similar ability to control the regulating activity of the phase responsive regulating circuitry of FIG. 1. When, for example, load 11 does not draw excessive output current, voltage oscillator 28 is arranged to operate through phase limiting network 32 to initiate control pulses at C and thereby cause the regulator circuit to operate in its voltage control mode. When, on the other hand, load 11 does draw excessive output current, current oscillator 43 is arranged to take over and operate through phase limiting network 32 to initiate the control pulses at C and thereby cause the regulator circuit to operate in its current control mode. The determination of which of these oscillators exerts this control is based upon the relative periods of the two oscillators, with the faster running oscillator assuming control. In other words, if, after the last control pulse, oscillator 28 produces a voltage control pulse before oscillator 43 produces a current control pulse, the voltage control pulse is utilized or, if oscillator 43 produces a current control pulse before oscillator 28 produces a voltage control pulse, the current control pulse is utilized.

To the end that either current oscillator 43 or voltage oscillator 28 may initiate control pulses at C, there is provided an OR-ing network 45. The latter network has an input 45a connected to output 28b of voltage oscillator 28, an input 45b connected to output 43b of current oscillator 43 and an output 45c at which appears an oscillator control signal OCS comprising a train of oscillator control pulses for application to phase limiting network 32. The term "oscillator control signal" has been adopted since it distinguishes this single signal from the two signals VCS and CCS from which it is generated, and since, from the standpoint of the following circuitry, it is unimportant whether each OCS pulse originated as a voltage control pulse or as a current control pulse.

After OR-ing network 45 selects either a voltage control pulse or a current control pulse to generate an oscillator control pulse, it is desirable that adjustments be made in the phase position of the oscillator whose pulse was not selected. If, for example, an OCS pulse is derived from a VCS pulse, it is desirable that the current oscillator 43 be driven to the beginning of its pulse generating cycle. Similarly, if an OCS pulse is derived from a CCS pulse, it is desirable that voltage oscillator 28 be driven to the beginning of its pulse generating cycle. This driving back is desirable because, by periodically restarting the control oscillators at the beginning of their operating cycles, it can easily be determined on a periodic basis which oscillator is running faster. As will be described more fully presently, this resetting is accomplished by means of a reset or speed up signal generated within OR-ing network 45 upon the occurrence of each OCS pulse.

In the present embodiment, voltage oscillator 28 and current oscillator 43 are restarted via speed-up networks 47 and 48, respectively. Each of these networks is connected to receive a speed-up signal from OR-ing network 45 and to substantially increaase the amplitude of the signal at the input of the respective oscillator to hasten the generation of a pulse thereby. The effect of this speed-up signal is to force the oscillator which is sped up to fire, i.e., produce an output pulse, at a time when that output pulse cannot initiate an extraneous pulse at junction C. If, for example, a voltage control pulse initiates an OCS pulse, current oscillator 43 will be force-fired via speed-up network 48 and thereby forced to generate a CCS pulse at a time when that pulse cannot initiate a control pulse at junction C. Similarly, if a CCS pulse initiates an OCS pulse, voltage oscillator 28 will be force-fired, via speed-up network 47, to generate a VCS pulse at a time when that pulse cannot initiate a control pulse at junction C.

Under some circumstances, it is desirable to prevent voltage oscillator 28 from proceeding through its pulse generating cycle for a time. When, for example, a VCS pulse occurs at a time when a control pulse initiated thereby would occur too soon in relation to the reference signal, it is desirable to have phase limiting network 32 prevent that VCS pulse from initiating a control pulse and to provide circuitry for preventing voltage oscillator 28 from undergoing further pulse generating activity. To the end that the pulse generating activity of oscillator 28 may be suspended, i.e., to the end that oscillator 28 may be frozen in whatever condition it is in, there is provided in the circuit of FIG. 1 a hold network 49 connected between the junction J1 at which the input signals for oscillator 28 are summed and the input 28a of voltage oscillator 28. Hold network 49, by turning off, serves to, in effect, disconnect input 28a from summing junction J1 and thereby prevent oscillator 28 from proceeding further along its pulse generating cycle. Thus, hold network 49 can be utilized to retard the phase of oscillator 28 with respect to the reference signal in much the same way that speed-up network 47 can be utilized to advance the phase of oscillator 28 with respect to the reference signal.

In view of the foregoing, it will be seen that the phase control circuit of the invention is adapted to generate reference and control signals which are locked in phase with the a-c input voltage waves and the control voltage waves, respectively, of an associated phase responsive regulator circuit. In addition, the phase control circuit of the invention is adapted to control the phase relationship between the reference and control signals, as required, to supply an a-c and/or d-c load with the desired, regulated output voltage. Furthermore, the phase control circuit of the invention is adapted to impose predetermined angular limits on the phase angle between the reference signal and the control signal and to limit the rate of change of the angle therebetween.

Specific illustrative examples of circuitry which may be utilized to produce the operation described in connection with the block diagram of FIG. 1 will now be described.

THE PHASE-LOCK CIRCUITRY OF FIG. 2

Referring to FIG. 2, there is shown a schematic drawing of the circuitry shown as blocks 20, 21 and 22 in FIG. 1. As previously described, the circuitry of FIG. 2 serves to generate at junction R a reference signal comprising a pulse train that is locked in phase with, and contains information as to the phase position of, all three phases of the a-c input voltage. The circuit of FIG. 2 also serves to generate at junctions Ra, Rb and Rc a plurality of reference squarewaves. Because, as will be described more fully later, the transitions of squarewaves at junctions Ra, Rb and RC are triggered by the transitions of reference signal RS, the reference squarewaves like the reference signal, are locked in phase with the a-c input voltage waves. A timing diagram illustrating the time relationships of the various voltages appearing in the circuit of FIG. 2, under steady-state, phase-lock conditions, is shown in FIG. 2a.

In the present embodiment, the circuitry of FIG. 2 includes a synchronous switching network 20 for, in effect, comparing the phase position of the polyphase input voltages with the phase position of the reference squarewaves which are generated by reference ring counter 22, and utilizing the result to adjust the frequency and phase position of the reference signal so as to establish the desired phase-lock relationship between the a-c input voltage and the reference signal. In the present illustrative embodiment, switching network 20 includes a plurality of current transformers 51AB, 51BC and 51CA which, together with current limiting resistors 42ab, 52bc and 52ca, serve to apply to the control system a-c currents Iab, Ibc and Ica that are proportional to the line-to-line voltages between a-c input terminals A, B and C. Switching network 20 also includes a plurality of P-channel junction field effect transistors (P-channel JFETS) 53a through 56a, 53b through 56b, and 53c through 56c which apply to operational amplifier 58a the currents Iab, Ibc and Ica the magnitudes of which vary in accordance with the phase position of the reference squarewaves. Finally, network 20 includes a plurality of control inputs $20a$, $\overline{20a}$, $20b$, $\overline{20b}$, $20c$ and $\overline{20c}$ whereby the conduction times of the above FETS may be controlled in accordance with the phase position of the reference squarewaves to compare the phase position of the a-c input voltages with the phase position of reference signal RS. The operational amplifier output voltage which results from this comparison is, in turn, utilized by reference oscillator 21 to adjust the phase relationship between the reference squarewaves and the polyphase input voltages to counteract deviations from the desired phase-lock relationship therebetween.

Figure 2D:
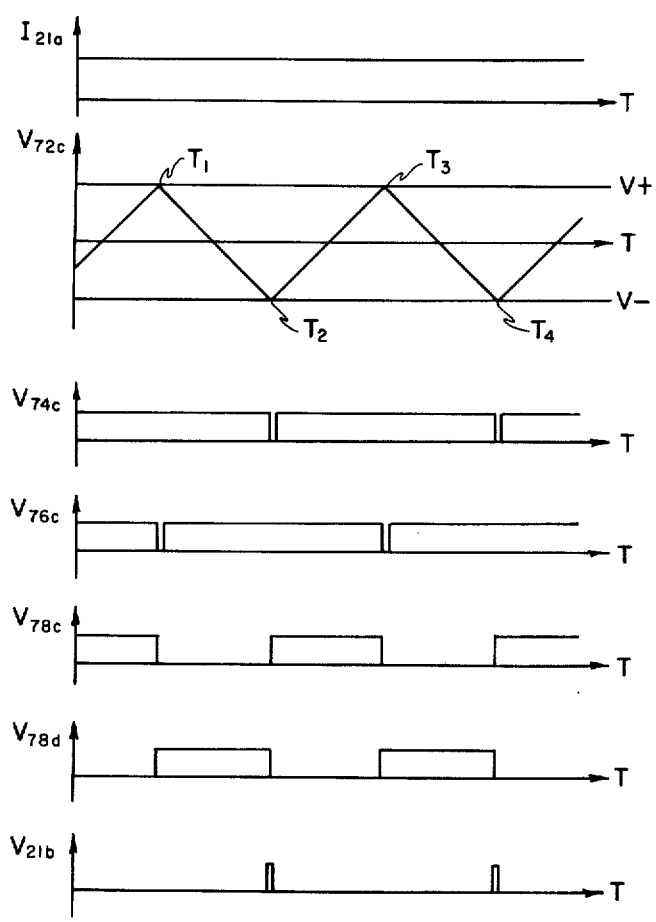
Figure 2A:
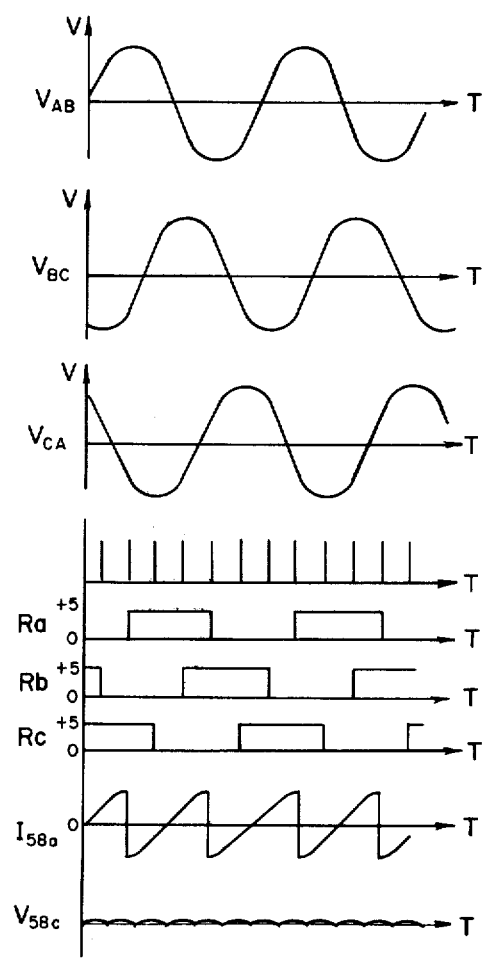

Assuming, as shown in FIG. 2a, that the reference squarewaves at junctions Ra, Rb and Rc lag 90° behind the respective line-to-line a-c input voltages $V_{AB}$, $V_{BC}$ and $V_{CA}$, FETS 53a through 56c will turn off during the low state periods and on during the high state periods of the associated reference squarewaves to apply to the input a of operational amplifier 58 a signal current having the waveform $I_{58}a$ shown in FIG. 2a. Because of the substantially zero average value of signal $I_{58}a$, and because of the filtering characteristic imparted to amplifier 58 by a capacitor 60 and a resistor 61, the voltage appearing at output c of amplifier 58 will be approximately zero as shown by voltage waveform $V_{58}c$. Under these conditions, the negligible current which amplifier 58 applies to oscillator input 21a, through a resistor 63 and output 20d of switching network 20, has no tendency to change the frequency or phase position of reference oscillator 21. As a result, the operating frequency of oscillator 21 will be determined by the bias current supplied to oscillator input 21a through an adjustable, nominal frequency control resistor 64. Thus, under the conditions shown in FIG. 2a, there exists no reference oscillator input signal which tends to alter the existing phase relationship between the a-c input voltages and the reference signal or the reference squarewaves.

If, under the above conditions, the reference squarewaves at Ra, Rb and Rc should drift in phase with respect to the a-c input voltages, the conduction periods of FETS 53a through 56c will vary accordingly to vary the average value of signal $I_{58}a$. As a result, amplifier 58 will apply to oscillator input 21a a signal which adds to or subtracts from the bias current supplied through resistor 64 to oppose that drift in phase. When the a-c input frequency varies from the nominal value set by resistor 64, the reference pulse train at junction R and the reference square-waves remain locked in phase with the a-c input voltage in the manner described above. In this situation, however, the average voltage at amplifier output 58c will have a non-zero steady-state value indicative of the deviation of the a-c input frequency from its nominal value. Thus, in spite of variations in the frequency of the a-c input voltage, the reference pulse train at junction R and the reference squarewaves will remain locked in phase therewith.

To the end that the signal appearing at output 20d of switching network 20 may adjust the frequency and phase of the reference signal, as required, to maintain the above described phase-lock relationship, there is provided a reference signal generating network or reference oscillator 21 which here takes the form of a voltage controlled oscillator (VCO). In other words, reference oscillator 21 is a circuit for generating at output 21b thereof a pulse train the period of which varies in accordance with the algebraic sum of the signal voltages (or currents) applied to the input 21a thereof. In the present three-phase embodiment, oscillator 21 is arranged to generate six reference pulses at oscillator output 21b during each full cycle of the a-c input voltage or, in other words, to generate a reference pulse at R during each 60° of the a-c input voltage. This elevated oscillator frequency assures that the reference pulse train reflects the condition of each half-cycle of each phase of the input voltage.

While the commercial availability of complete, prepackaged VCO's, which would be satisfactory as substitutes for the reference oscillator included in block 21 of FIGS. 1 and 2, would appear not to justify a detailed description thereof, oscillator 21 will nevertheless be described in detail. This is, in part, because the same basic oscillator configuration is also utilized in voltage oscillator 28 and current oscillator 43. More importantly, however, this is because the subject oscillator has distinct advantages over the most nearly similar commercially available oscillators and because these advantages assume great significance when such an oscillator is used, as are oscillators 28 and 43, with one or more damping signals applied to the input thereof.

In the present embodiment, oscillator 21 includes an operational amplifier 66 which serves as a buffer and an input signal summing network, operational amplifiers 68 and 70 which serve to generate complementary signals which vary in accordance with the signal applied thereto by amplifier 66, an operational amplifier 72 which serves as an up-and-down integrating network, voltage comparators 74 and 76 which serve as voltage level sensors to set positive and negative limits of the integrating activity of amplifier 72, flip-flop 78 which controls reversals in the direction of integration in integrator 72, and a monostable multivibrator 80 for setting the duration of the reference pulses appearing at oscillator output 21b. Op-amps 66 through 72 are all of the same basic type, i.e., op-amps which have both positive and negative power inputs with an intermediate input at the potential of the system ground and which have the capability of producing both positive and negative output voltages with respect to that system ground. Voltage comparators 74 and 76, on the other hand, are open-collector devices which, together with their pull-up resistors 75c and 77c serve to interface oscillator 72 with the following digital switching circuitry.

Operational amplifier 66, together with its associated input resistors 63 and 64 and its negative feedback resistor 67 serves as a buffer network to effectively isolate the signals at oscillator input 21a from the internal voltages and currents of oscillator 21. This it accomplishes by establishing virtual ground potential at input a via input b. Amplifier 66 also serves as an inverting type summing network to invert the phase of the signal at output c thereof in relation to the signals at input a thereof and to establish at output c a voltage dependent upon the algebraic sum of the signal currents at oscillator input 21a.

Operational amplifier 68 together with its negative feedback conductor 68d serves as a non-inverting type voltage follower, that is, a circuit which generates at its output a voltage which is equal to but effectively isolated from the voltage applied to its input. Similarly, amplifier 70 together with its negative feedback resistor 71d and its input resistor 71e functions as an inverting type voltage follower, that is, a circuit which generates at its output a voltage that is equal and opposite to the voltage at its input and that is effectively isolated from the voltage at its input. Thus, there appear at outputs c of amplifiers 68 and 70 complementary signals that vary in accordance with the albegraic sum of the signal currents at oscillator input 21a.

Operational amplifier 72, together with its feedback capacitor 72d serves to generate at output c thereof a voltage which varies inversely in accordance with the integral of the signal current applied to input a thereof. When, for example, the net signal at oscillator input 21a is positive and a first P-channel JFET 73b conducts, the resulting negative signal at output c of amplifier 68 is applied to input a of amplifier 72, through a resistor 73c, causing the signal at output c of amplifier 72 to vary in the positive direction in accordance with the integral of the signal at oscillator input 21a. When, on the other hand, the net signal at oscillator input 21a is positive and a second P-channel JFET 73d conducts, the resulting positive signal at output C of amplifier 70 is applied to input a of amplifier 72, through a resistor 73e, causing output c of amplifier 72 to vary in the negative direction in accordance with the integral of the signal at oscillator input 21a. Thus, depending upon whether FET 73b or 73d conducts, the signal at output c of amplifier 72 can vary either positively or negatively in accordance with the integral of the positive signal applied to oscillator input 21a.

In accordance with one feature of the present invention, oscillator 21 is arranged to produce a reference pulse at oscillator output 21b and junction R each time that amplifier 72 undergoes a complete up-and-down cycle of integration, that is, each time that the voltage at output c of amplifier 72 varies from a first, for instance, negative predetermined value (negative integrating limit) to a second, for instance, positive predetermined value (positive integrating limit) and returns again to the first, negative predetermined value. This integrating characteristic assures that when the signal at oscillator input 21a has a relatively high magnitude, amplifier 72 runs through its integrating cycle within a relatively short time to produce a reference pulse train having a relatively short period and that when the signal at oscillator input 21a has a relatively low magnitude, amplifier 72 runs through its integrating cycle in a relatively long time to produce a reference pulse train having a relatively long period. Thus, the frequency or the repetition rate of the reference signal at junction R varies in accordance with the magnitude of the net signal applied to oscillator input 21a.

In the circuit of FIG. 2, the positive integrating limit is imposed by voltage comparator 76. The input voltage level at which comparator 76 will switch from its low output state (ground potential at output c) to its high output state (+5 volts at output c) and vice-versa is determined by a voltage divider including resistors 77a and 77b connected between a suitable +15 volt supply and ground. In operation, comparator 76 will establish its high output state when the positive threshold voltage applied to input b thereof exceeds the positive signal voltage which amplifier 72 applies to input a thereof, and will establish its low output state when the positive signal voltage which amplifier 72 applies to input a thereof exceeds the positive threshold voltage applied to input b thereof.

Figure 2F:
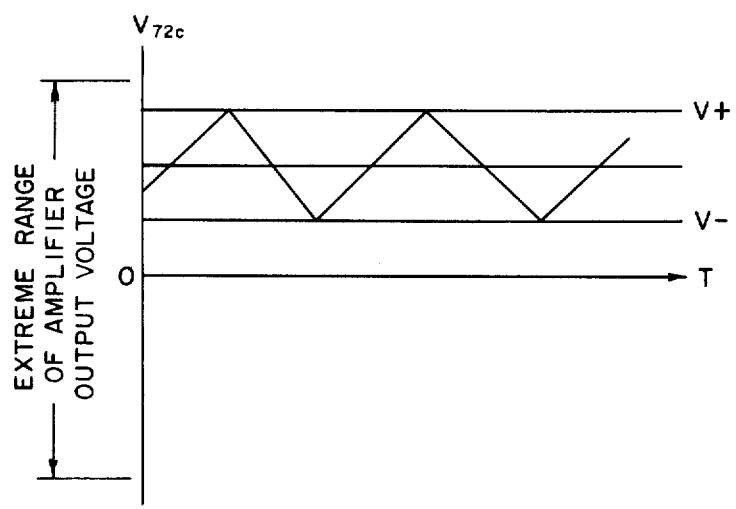

Similarly, the negative integrating limit is imposed by comparator 74 which drives output c thereof to its high state when the negative signal voltage which amplifier 72 applies to input b thereof fails to exceed the negative threshold voltage applied to input a thereof by a voltage divider 75–75b connected between ground and a suitable −15 volt supply. On the other hand, comparator 74 will drive its output c to its low state when the negative signal voltage which amplifier 72 applies to input b thereof does exceed the negative threshold voltage applied to input a thereof by voltage divider 75a–75b. It will be understood, however, that if the integrating range V+ to V− is sufficiently narrow in relation to the output voltage range of amplifier 72, limit V− may be chosen to have a zero volt or even a positive value, as shown in FIG. 2F, provided that a suitable magnitude and polarity of threshold voltage is applied to comparator input 74a. This offset of limit V− may be desirable to provide sufficient room for $V_{72}c$ to vary outside of limits V+ and V− as shown in connection with FIG. 5a.

To the end that the conductive states of FETS 73b and 73d may be reversed when the voltage at output c of amplifier 72 first reaches the positive integrating limit after having reached the negative integrating limit or first reaches the negative integrating limit after having reached the positive integrating limit, there are provided a flip-flop 78 and inverting gates 79a and 79b. Flip-flop 78 includes a set input a, a reset input b, a Q output c and a $\overline{Q}$ output d. In this type of flip-flop, a high-to-low or negative transition at set input a will cause a high state voltage to appear at Q output and a low state voltage to appear at $\overline{Q}$ output d. Similarly, a negative transition at reset input b will cause a high state voltage to appear at $\overline{Q}$ output d and a low state voltage to appear at Q output c.

Assuming, as shown in FIG. 2d, that at time $T_0$ FET 73b is conducting and that the net signal current $I_{21a}$ at oscillator input 21a has a constant, positive value, the voltage $V_{72c}$ at the output c of amplifier 72 will be increasing in the positive direction and have a constant slope. FET 73b conducts at this time because a substantially zero volt control voltage is applied to the gate thereof through inverting gate 79a as a result of the high-state voltage $V_{78c}$ appearing at output c of flip-flop 78. At the same time, FET 73d is not conducting because a +15 volt control voltage is applied to the gate thereof, through a pull-up resistor 73g, as a result of the low-state voltage $V_{78d}$ appearing at output d of flip-flop 78.

At time $T_1$, when voltage $V_{72c}$ at output c of amplifier 72 reaches the positive integrating limit V+, a negative transition occurs at output c of comparator 76 and resets flip-flop 78. The resulting high at output d of flip-flop 78 operates, through inverting gate 79b, to turn on FET 73d. At the same time, the resulting low at output c of flip-flop 78 operates, through inverting gate 79a to turn off FET 73b. Under these conditions, the same positive input signal current $I_{21a}$ will cause integrator 72 to begin integrating in the negative direction with a negative slope equal to the previous positive slope. Thus, as the output voltage of integrator 72 reaches positive integrating limit V+, as a result of the conduction of FET 73b and the non-conduction of FET 73d, the states of flip-flop 78 and FETS 73b and 73d are reversed to cause integrator 72 to integrate negatively toward negative integrating limit V−.

It will be understood that when the voltage $V_{72c}$ reaches negative integrating limit V− at time $I_2$, the states of flip-flop 78 and FETS 73b and 73d will once again reverse to again reverse the direction of integration in integrator 72. Thus, under the assumed condition at oscillator input 21a, integrator 72 integrates alternately positively and negatively between the upper and lower integrating limits, at a rate determined by the magnitude of the net input signal at that input. Naturally, if the magnitude of net signal $I_{21a}$ is not constant, the slopes of the negatively and positively sloped portions of voltage $V_{72c}$ will not be constant, but will change, as required, to reflect the variations in the magnitude of that net input signal.

Since monostable multivibrator 80 is connected between output d of flip-flop 78 and oscillator output 21b and is of the type which produces a positive pulse at output c thereof upon the appearance of a negative transition at input a thereof, reference pulses appear at junction R only at those times, such as T2 and T4 in FIG. 2d, when the integrator output voltage reaches negative integrating limit V−. As a result, the total integrating time (the period of oscillator 21) is determined by the time required to execute an up-and-down integration which starts and ends at the same point. Accordingly, there is no inherent periodic "dead time" during which the oscillator is being reset to its starting point as there is in previously available oscillator circuits. In addition, the repetition rate of the reference pulses at junction R is approximately one-half the rate at which flip-flop 78 and FETS 73b and 73d change states.

To the end that the reference pulses at R may control the conduction of FETS 53a through 56c and, thereby, control the generation of the previously described frequency adjusting signal at switching network output 20d, there is provided reference ring counter 22. In the present embodiment, counter 22 includes J-K flip-flops 82, 83 and 84 connected in a well-known ring counter configuration, that is, connected so that a pulse train applied to counter input 22x results in a set of six squarewaves, each having a frequency one-sixth of that of the applied pulse train, being generated at counter outputs 22a, $22\overline{a}$, 22b, $22\overline{b}$, 22c and $22\overline{c}$. The relationships of these six reference squarewaves to the applied reference pulse train is shown in FIG. 2e. Because circuitry of this type is old and well-known to those skilled in the art, it will not be described in detail herein.

In applying the six reference squarewaves in switching control relationship to the gate electrodes of FETS 53a through 56c, it is desirable to utilize inverting gates 85a through $85\overline{c}$ and respective pull-up resistors 86a through $86\overline{c}$. These inverting gates and pull-up resistors not only assure the proper phase relationship between the reference squarewaves and the conduction periods of the associated FETS, but also assure that each voltage applied to the FETS is a two-state voltage comprising a low state voltage of zero volts for turning the associated FETS on and a high state voltage of +15 volts for turning the associated FETS off. Thus, inverting gates 85a through $85\overline{c}$ and pull-up resistors 86a through $86\overline{c}$ provide interfaces between the zero and +5 volt switching levels of counter 22 and the zero and +15 volt switching levels of switching network 20.

From the foregoing description of FIG. 2, it will be seen that switching network 20, oscillator 21 and counter 22 cooperate to generate a reference pulse train and reference squarewaves which remain locked in phase with and contain information as to the phase position of all phases of the a-c input voltage. Furthermore, it will be seen that the separation between successive reference pulses occupies 60° of the a-c input voltage for any frequency within a wide range of a-c input voltage frequencies. It will be understood that if, under appropriate circumstances, sufficiently accurate information as to the phase position of all three phases of the a-c input voltage can be derived from only one of the three phases thereof, synchronous switching network 20 may be replaced by any suitable single phase synchronous switching network.

THE CIRCUITRY OF FIG. 3

As previously described, the control signal at junction C is locked tightly in phase with the control waves generated by wave generator 13. This phase-lock results from the fact that the control signal at junction C initiates each transition of each control wave. The manner in which the desired control waves are initiated by the control signal will now be described.

Figure 3:
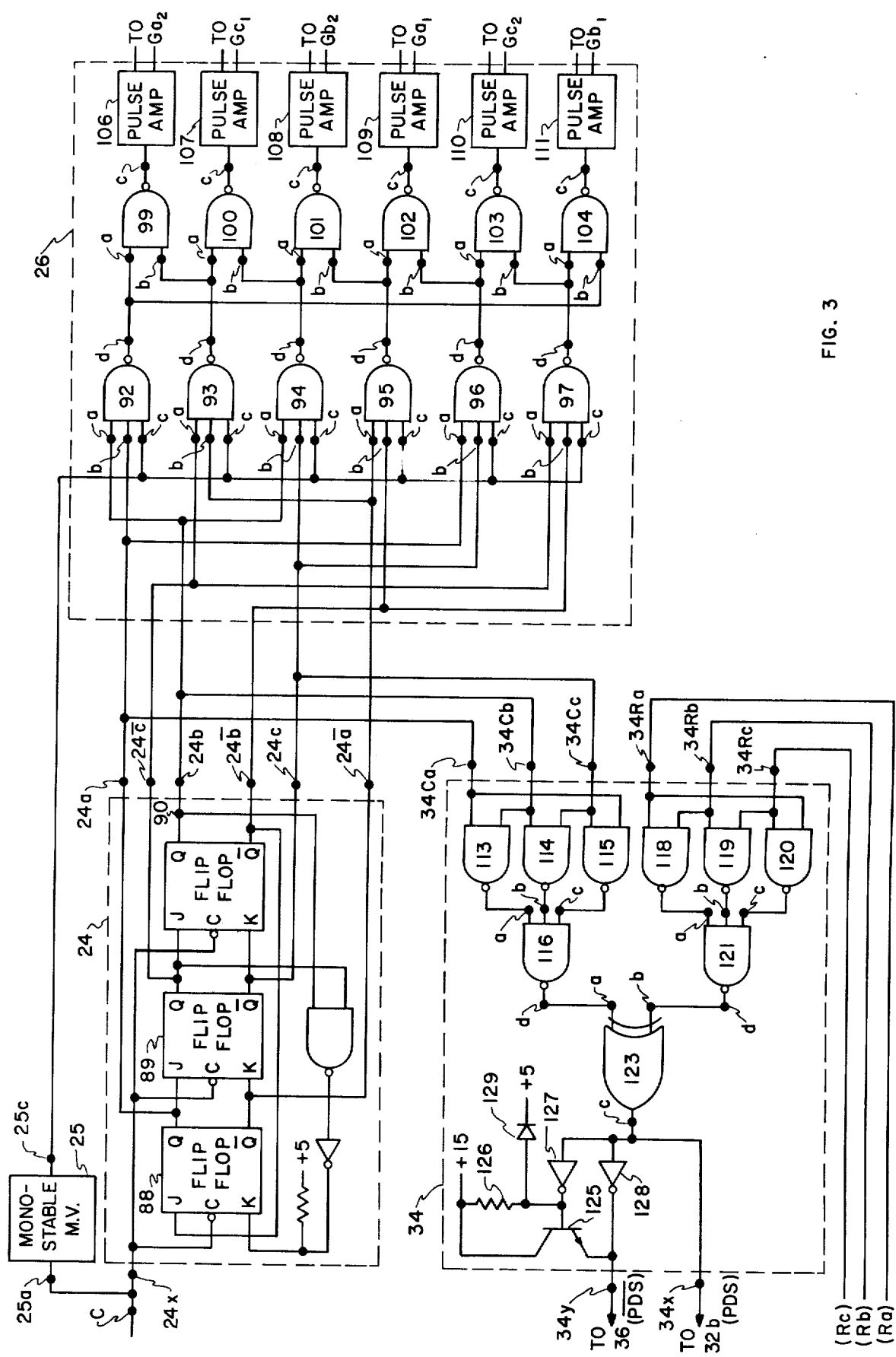

Referring to FIG. 3 there is shown a control ring counter 24 for generating at outputs 24a, 24b, 24c, $\overline{24a}$, $\overline{24b}$ and $\overline{24c}$ thereof a plurality of control squarewaves the transitions of which are determined by transitions of the control pulses which are applied to input 24x thereof. Also shown in FIG. 3 is the circuitry of distributor and pulse amplifier network 26 which fires the SCR's of wave generator 13, in the proper sequence, at the times determined by the control pulses at junction C. FIG. 3 also shows the circuitry of phase difference detector network 34 which serves to compare the phase position of the control squarewaves applied to inputs 34Ca, 34Cb and 34Cc thereof with the phase position of the reference squarewaves applied to inputs 34Ra, 34Rb and 34Rc thereof, and to generate at outputs 34x and 34y thereof two-state phase difference signals PDS and $\overline{PDS}$, the duty-cycles of which vary in accordance with the phase angle $\phi$ by which the control signal at junction C lags the reference signal at junction R. Finally, the circuit of FIG. 3 includes a monostable multivibrator 25 for generating and applying to distributor 26 a distributor timing pulse of predetermined duration each time that a control pulse appears at C. As will be described more fully presently, these distributor timing pulses set the duration of the firing pulses applied to the SCR's of wave generator 13.

In the present embodiment, control ring counter 24 includes U-K flip-flops 88, 89 and 90 which are connected together in the same manner as the flip-flops of reference ring counter 22 of FIG. 2. Counter 24 serves to generate at the outputs 24a, $\overline{24c}$, 24b, $\overline{24b}$, 24c and $\overline{24a}$ thereof, six control squarewaves each having one-sixth of the frequency of the control pulse train applied to input 24x thereof. Because, as previously described, ring counters of this type are old and well-known to those skilled in the art, the operation thereof will not be described in detail herein. The relationship of the control pulses and the control squarewaves initiated thereby is, however, shown in FIG. 3a.

In the present embodiment, distributor and pulse amplifier network 26 includes a plurality of three input NAND gates 92 through 97 for gating the control squarewaves together so as to establish the sequence in which the SCR's of wave generator 13 will be fired. Distributor 26 also includes a plurality of two input NAND gates 99 through 104 for selecting the pairs of SCR's to which firing pulses will be applied in the sequence established by gates 92 through 97. Finally, distributor 26 includes a plurality of pulse amplifier networks 106 through 111 for applying to the SCR's of wave generator 13 firing pulses of suitably high voltage and current, at the times determined by gates 99 through 104.

Figure 3A:
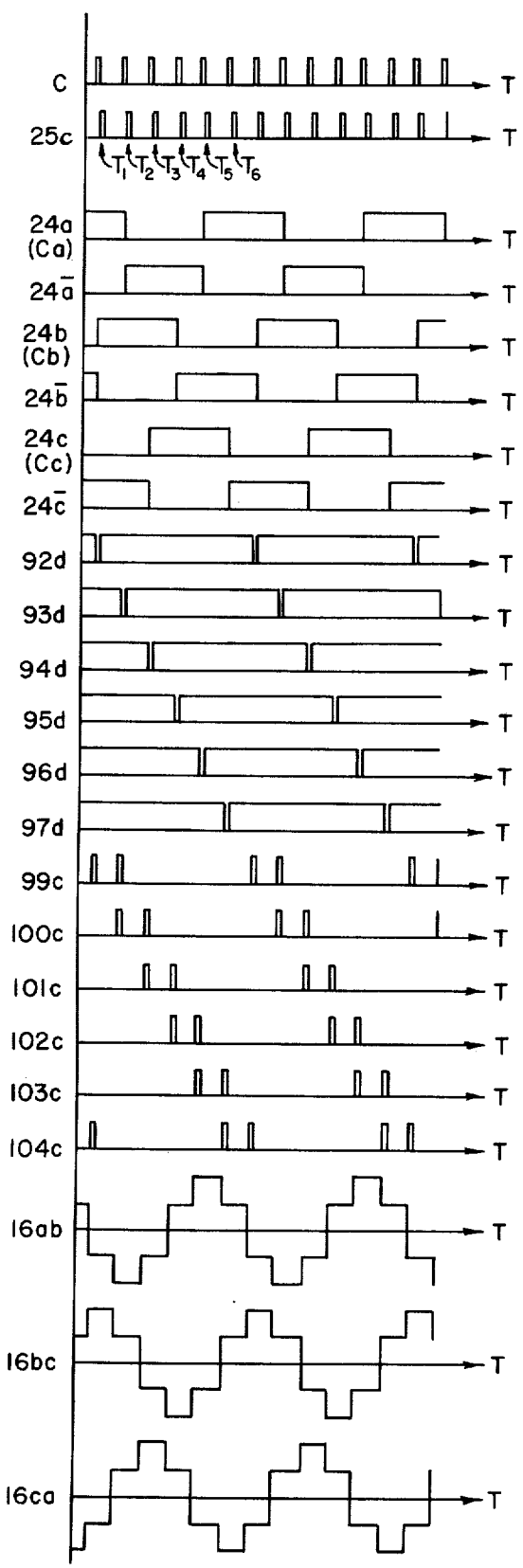

Referring to FIGS. 3 and 3a, it will be seen that a control pulse initiates each of the transitions at the outputs of flip-flops 88, 89 and 90 and thereby each of the transitions of the desired control squarewaves. More particularly, the transitions of the control squarewaves occur on the negative transitions of the control pulses at C. These transitions also initiate the distributor timing pulses generated by monostable multivibrator 25. The latter relationship assures that each timing pulse continues for a time after the occurrence of the nearest preceeding transition of the control squarewaves. The reason for these relationships will be apparent from the following description of the operation of network 26.

Gates 92 through 97 are connected to receive the control squarewaves generated by counter 24 and the timing pulses generated by multivibrator 25 and to utilize these voltages to generate pulses sequentially, one at a time, on a periodic basis. At time $T_1$, for example, as shown in FIG. 3a, multivibrator 25 produces a high state distributor timing pulse at the same time that control ring counter outputs 24a and 24b are high. As a result, a low state pulse having a duration equal to the duration of the distributor timing pulse appears at output d of gate 92. Similarly, low state pulses appear at the outputs of gates 93, 94, 95, 96 and 97 respectively, upon the occurrence of the timing pulses which occur at times $T_2$, $T_3$, $T_4$, $T_5$ and $T_6$. Thereafter the above described sequence of low state voltage pulses repeats itself for subsequently occurring sets of six timing pulses. Thus, gates 92 through 97 utilize the control squarewaves and the distributor timing pulses to generate a periodically occurring sequence of six low state pulses of predetermined duration.

Gates 99 through 104 are connected to the outputs of gates 92 through 97 so that firing pulses may be applied to preselected pairs of thyristors $17a_1$ through $17c_2$ or wave generator 13 in the sequence established by gates 92 through 97. At time $T_1$, for example, the low state pulse at output d of gate 92 causes high state voltage pulses to appear at the outputs of gates 99 and 104. The latter pulses energize pulse amplifiers 106 and 111, respectively, which, in turn, energize SCR's $17a_2$ and $17b_1$ of wave generator 13. The energization of the latter thyristors, in turn, causes the control wave transitions shown in capacitor voltage waveforms 16ab, 16bc and 16ca. It will be understood that the pulses occurring at times $T_2$ through $T_6$ initiate the remaining transitions of a complete cycle of the control waves, as shown in FIG. 3a.

As previously described, it is desirable that each control wave occur within an angular window bounded by 0° to 60° of lag behind the corresponding a-c input voltage wave. In addition, it is desirable to allow angle $\phi$ to vary freely within these limits to afford precise control over the regulator output voltage and current. Furthermore, it is desirable from a control standpoint that the rate of change of the phase angle between the input voltage waves and the control voltage waves be limited, that is, spread over two or more 60° intervals. In accordance with the present invention, these constraints are imposed by imposing analogous constraints on the relationship between reference signal RS and control signal CS.

To the end that the phase control circuitry of the invention may establish a phase difference signal the characteristics of which make it suitable for use in imposing the above described constraints, there is provided in the circuit of FIG. 3 a phase difference detector network 34. The latter network has inputs 34Ca, 34Cb and 34Cc which are connected to receive the control squarewaves, inputs 34Ra, 34Rb and 34Rc which are connected to receive the reference squarewaves, and outputs 34x and 34y at which appear phase difference signal PDS and its complement $\overline{PDS}$. Because the latter signals are generated from a plurality of each type of squarewave, signals PDS and $\overline{PDS}$ reflect the three phase character of the a-c input voltage as well as the three phase character of the control waves.

Figure 3B:
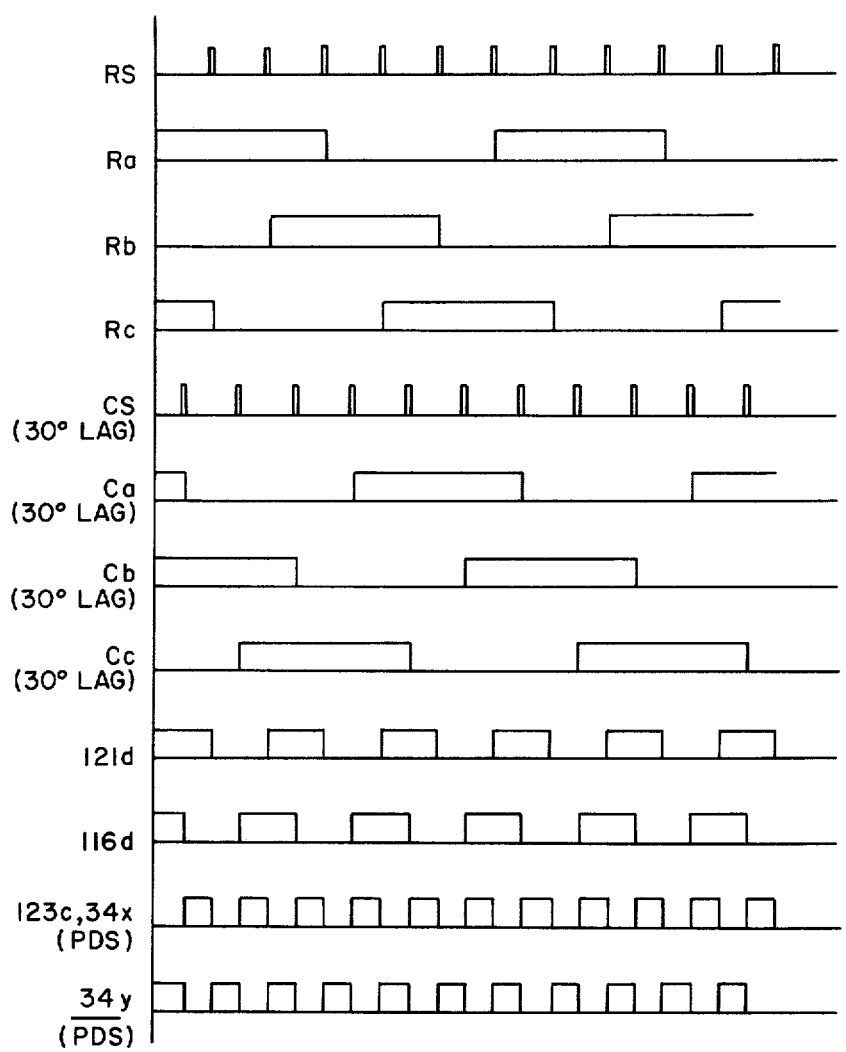

As shown in FIG. 3, phase detector 34 includes a first gating network including gates 113, 114, 115 and 116 for establishing at the output d of gate 116 a two-state signal which reflects the transitions of all three of the control squarewaves at detector inputs 34Ca, 34Cb and 34Cc. During operation, output d of gate 116 will be high when the control squarewaves at any of the following pairs of inputs are both high: 34Ca and 34Cb; 34Cb and 34Cc; or 34Ca and 34Cc. The waveform of the resulting voltage is shown in curve 116d of FIG. 3b. Detector 34 also includes a second gating network including gates 118, 119, 120 and 121 which serve a similar function with respect to the reference squarewaves at detector inputs 34Ra, 34Rb and 34Rc. The waveform of the resulting two-state voltage at output d of gate 121 is shown in curve 121d of FIG. 3b.

Detector 34 also includes an exclusive-OR gate 123 for comparing the voltages at outputs of gates 116 and 121 and for establishing at the output of gate 123 a two-state voltage which is high when the signals at inputs a and b thereof are in unlike states and which is low when those signals are in like states. The waveform of the voltage at output of gate 123, for an assumed control angle of 30°, is shown in curve 123c of FIG. 3b and is referred to herein as phase difference signal PDS. An examination of the latter Figure will reveal that each positive transition of signal PDS is initiated by a negative transition of the control signal and each negative transition of signal PDS is initiated by a negative transition of the reference signal. The same relationships, with appropriate reversals in sign, apply between signal PDS and the reference and control signals. As will be described more fully later, these relationships between signals RS, CS and PDS allow a determination of whether each oscillator control pulse occurs prior to, within, or after the associated angular reference window.

Phase difference detector 34 also includes an NPN transistor 125, a bias resistor 126, inverting gates 127 and 128 and a diode 129. These components serve to establish at output 34y of phase detector 34 a form of phase difference signal $\overline{PDS}$ which is the complement of signal PDS, but which has a substantially greater current supplying and current sinking capability. As will be described more fully later, this greater supplying and sinking ability allows signal $\overline{PDS}$ to be utilized as the damping signal which limits the rate of change in control angle $\phi$.

THE VOLTAGE AND CURRENT SENSING CIRCUITRY OF FIG. 4

To the end that there may be generated an analog voltage control signal that varies in accordance with the deviations in the regulator output voltage from its regulated value, there is provided in FIG. 4 a voltage sensing network 30. In the present embodiment, voltage sensing network 30 includes an operational amplifier 130 having an inverting input a, a non-inverting input b and an output c. Associated with amplifier 130 are input resistors 131, 132, 133 and 134, a negative feedback resistor 135 and a resistor 136 connected between non-inverting input b and the control system ground. Amplifier 130 and its associated resistors serve to step down the regulator output voltage to a level suitable for application to the associated control system circuitry. In the event that load 11 comprises a battery, it may be desirable to insert a capacitor 137 between resistor pairs 131–132 and 133–134 to modify the dynamic response of the control system.

Sensing network 30 also includes an operational amplifier 139 together with an associated input resistor 140, an associated adjustable negative feedback resistor 141, a regulator output voltage adjusting resistor 142 and an output resistor 143. Together, amplifier 139 and its associated resistors serve to compare the signal current established by amplifier 130 to an adjustable reference current established by a suitable +15 volt supply and to generate at output c of amplifier 139 an analog voltage control signal that varies in accordance with the difference therebetween. Resistor 141 allows the gain of amplifier 139 to be adjusted to any suitable value. Output resistor 143 converts the signal voltage at the output c of amplifier 139 to a signal current which varies in accordance with the regulator output voltage and which is suitable for application as a signal current to voltage oscillator 28 of FIGS. 1 and 5. Thus, the signal current at the output c of amplifier 139 varies in accordance with the difference between a current that is representative of the d-c output voltage and an adjustable reference current.

To the end that there may be generated an analog current control signal which varies in accordance the current which source 10 supplies to load 11, there is provided in FIG. 4 a current sensing network 39. As will be described more fully later, this output current signal is utilized primarily to control current oscillator 43 of FIGS. 1 and 5 so that the latter may limit the current supplied by the regulator circuit of FIG. 1 to a predetermined safe value. One particularly advantageous coupling network 40 for providing current sensing network 39 with a raw output current indication is described, in detail, in the U.S. patent application of Harold J. Brown, Ser. No. 348,498, filed Apr. 6, 1973, entitled "D-C Current Measuring Circuit," the disclosure of which is hereby expressly incorporated herein by reference. Because an understanding of coupling network 40 is not essential to the understanding of the present invention, it will not be further described herein, except to state that the signal provided thereby is an analog voltage proportional to the current flowing in the regulator output, including the ripple component thereof.

In the present embodiment, current sensing network 39 includes an operational amplifier 145 together with an associated negative feedback resistor 145e, and a resistor 145f connected between inverting input a of amplifier 145 and the control system ground. Together these components serve as a non-inverting amplifier and as a buffering network which substantially isolates coupling network 40 from the internal voltages and currents of the control systems.

Current sensing network 39 also includes an operational amplifier 146 together with an associated input resistor 146d, an associated resistor-capacitor feedback network comprising a capacitor 146e and a resistor 146f, and an associated current limit adjusting resistor 146g. Amplifier 146 and its associated resistors serve as a filter network to generate at output c of amplifier 146 an analog current control signal the magnitude of which varies in accordance with the output current signal which coupling network 40 applies to sensor input 39a. Resistor 146g applies to amplifier 146 an adjustable reference current which sets the maximum output current level through load 11.

Also included in sensing network 39 is an operational amplifier 147 together with an associated input resistor 147d, an associated adjustable negative feedback resistor 147e, and an output resistor 147f. Amplifier 147 and its associate resistors serve as a scaling or multiplying network to establish at amplifier output c an analog output current control signal the magnitude of which varies in accordance with a constant or scaling factor times the signal established by amplifier 146. Output resistor 147f converts the signal voltage at the output c of amplifier 147 to a signal current which varies in accordance with the current in load 11 and which is suitable for application to current oscillator 43 of FIGS. 1 and 5.

THE VOLTAGE AND CURRENT OSCILLATORS OF FIG. 5

Figure 5:
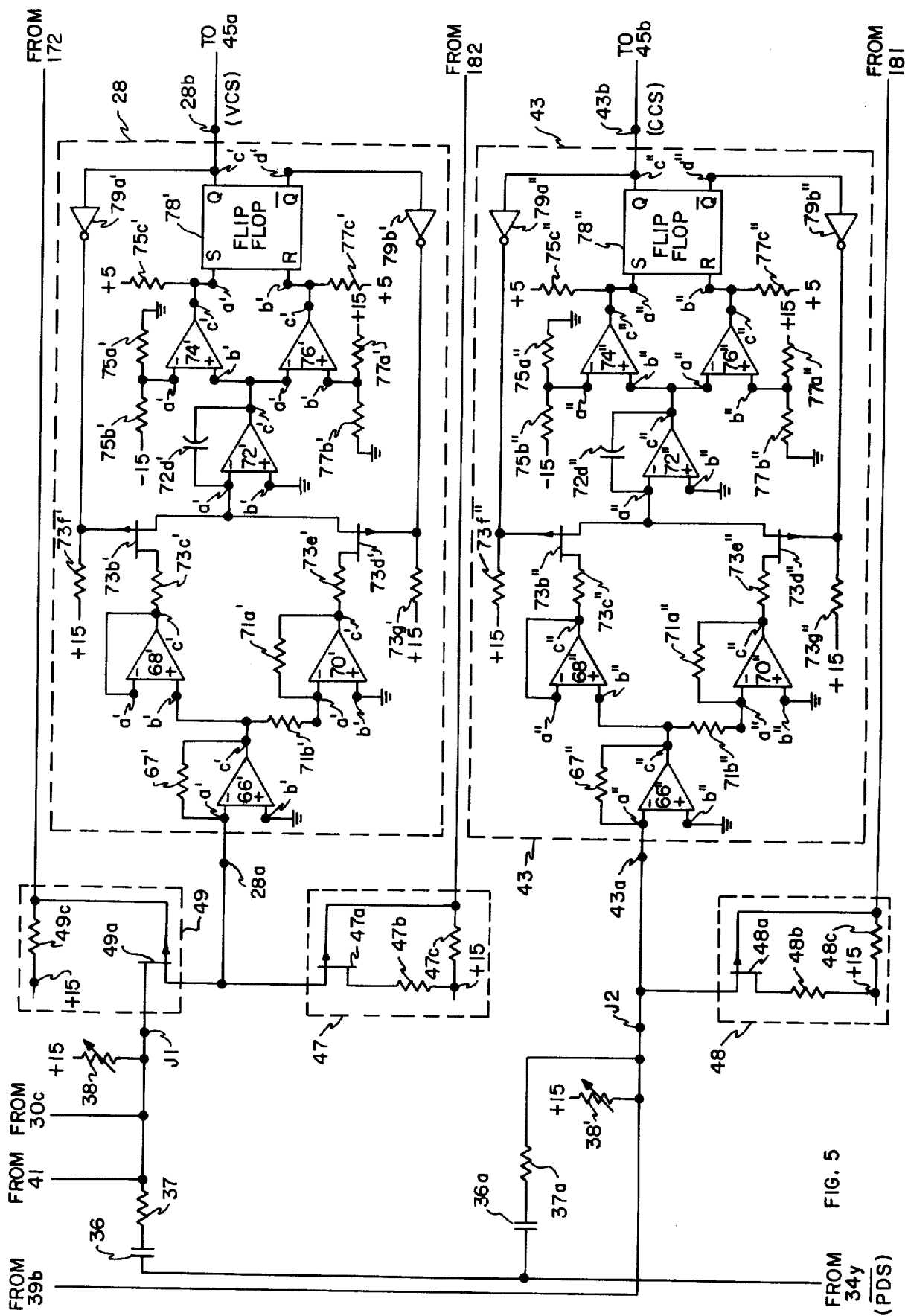
Figure 5A:
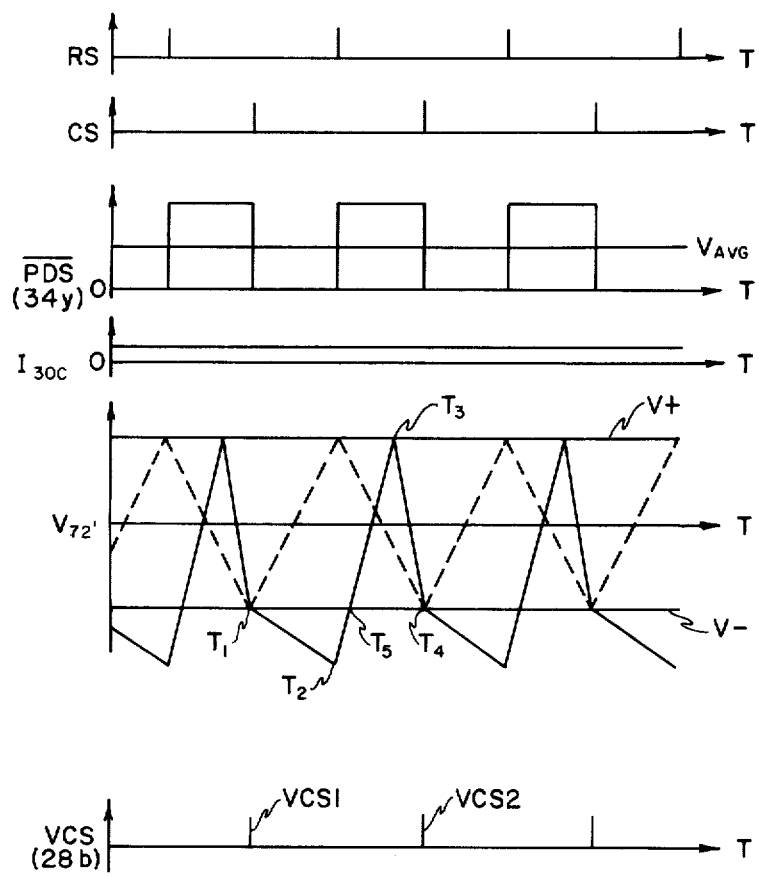

To the end that there may be generated a periodic voltage control signal VCS having a period that varies in accordance with the analog voltage control signal established by voltage sensing network 30, there is provided, as shown in FIG. 5, a voltage control signal generator or voltage oscillator 28 having an input 28a and an output 28b. Except for the absence in oscillator 28 of FIG. 5 of a monostable multivibrator corresponding to multivibrator 80 in reference oscillator 21 of FIG. 2, oscillator 28 is structurally and functionally similar to reference oscillator 21 and each component in oscillator 28 has been labeled with the indicia used for the corresponding component in oscillator 21, with the addition of a prime superscript. Because of this similarity and because the operation of reference oscillator 21 was described previously, the operation of oscillator 28 will not be described in detail. The voltage and current waveforms produced by oscillator 28 are shown in FIG. 5a.

As shown in FIG. 5, the analog voltage control signal established by voltage sensing network 30 is applied to oscillator input 28a through the source-drain path of a P-channel JFET 49a in hold network 49. The latter FET serves, when conducting, to provide a low impedance connection between signal summing junction J1 and oscillator input 28a. Under this condition, oscillator 28 controls the periodicity of voltage control signal VCS at output 28b thereof in accordance with the analog voltage control signal current generated by voltage sensing network 30, the oscillator bias current supplied through adjustable bias resistor 38 and the damping signal supplied by phase difference detector 34 through a-c coupling network 36-37. FET 49a also serves, when non-conducting, to prevent any of the signals at summing junction J1 from being applied to oscillator input 28a. Under this condition, oscillator 28 cannot proceed through its usual integrating cycle and is, in effect, frozen in the condition which existed at the time when FET 49a became nonconducting. The significance of this "hold" capability will be described more fully in connection with the circuitry of FIG. 6.

Also connected to oscillator input 28a is a speed-up network 47 including a P-channel JFET 47a, the source-drain path of which is connected between a suitable +15 volt supply and oscillator input 28a. FET 47a serves, when conducting, to apply to oscillator input 28a, through resistor 47b, a speed-up current sufficient to substantially increase the rate at which oscillator 28 proceeds through its integrating cycle. FET 47a also serves, when non-conducting, to allow oscillator 28 to proceed through its integrating cycle in the normal manner. The significance of this "speed-up" capability will also be described more fully in connection with the circuitry of FIG. 6.

To the end that there may be generated a periodic current control signal CCS having a period that varies in accordance with the analog current control signal established by current sensing network 39, there is provided a current control signal generator or current oscillator 43 having an input 43a and an output 43b. Current oscillator 43 is virtually identical to voltage oscillator 28 and is, therefore, structurally and functionally similar to reference oscillator 21. Accordingly, the operation of current oscillator 43 will not be described in detail. In order to facilitate reference back to the operation of reference oscillator 21, however, each component in oscillator 43 has been labeled with the indicia used for the corresponding component in oscillator 21, with the addition of a double prime superscript.

As shown in FIG. 5, oscillator input 43a is connected to output 39b of current sensing network 39 to receive the analog current control signal current generated thereby. Oscillator input 43a is also connected to the +15 volt supply, through an adjustable bias resistor 38' to receive a suitable oscillator bias current. Finally, oscillator input 43a is connected through a-c coupling network 36a-37a to receive a damping signal from phase difference detector 34. It will be understood that each of these signals may be applied to oscillator input 43a through a hold network such as 49, but that this hold network has been omitted in FIG. 5 since its presence is not ordinarily required in a control system for a voltage regulating circuit.

Also connected to oscillator input 43a is a speed-up network 48 including a P-channel JFET 48a the source-drain path of which is connected between a suitable +15 volt supply and oscillator input 43a. It will be understood that FET 48a serves the same function with respect to current oscillator 43 that FET 47a serves with respect to voltage oscillator 28.

As previously described in connection with reference oscillator 21 of FIG. 2, the direction of integration in oscillators 28 and 43 is independent of the polarity of the net signal at the inputs of these oscillators. For example, a net positive input signal current may produce either an upward or downward integration, depending upon the conductive states of FETS 73b' and 73d' or 73b'' and 73d''. The same is true for a negative net oscillator input signal. A corollary of this characteristic is that, for an assumed state of conduction in the last-named FETS, the direction of integration is dependent upon the polarity of the net oscillator input signal. As a result, if the oscillator is integrating in a given direction and both the polarity of the net input signal and the conductive states of the FETS should reverse, there will be no change in the direction of integration. This characteristic allows the integrated output voltage to vary outside of integrating limits V+ and V−.

Also as previously described in connection with reference oscillator 21 of FIG. 2, the presence of flip-flop such as 78′ and 78″ in oscillators 28 and 43 assures that, once one integrating limit has been attained and has reversed the conductive states of the associated FETS, further arrivals of the integrator output voltage at that integrating limit have no effect upon the conductive states of the FETS until after the other integrating limit has been reached. This characteristic, together with the above described out-of-limits characteristic, allows the integrators within oscillators 28 and 43 to produce voltages which vary outside of and recross the integrating limits without upsetting the progress of the integrating cycle. The latter feature greatly increases the number of possible paths which the integrated output voltage can follow during the course of an integrating cycle. See, for example, FIG. 5a and the description of the effect of damping signal $\overline{PDS}$.

Another important advantage of utilizing controllable oscillators of the type shown in FIGS. 2 and 5 is the resulting reduction of the effect of synchronous ripple on the control system. Given the assumed set of three phase a-c input voltages, each of which has a frequency of 60 hertz, the ripple voltage which finds its way into the control system will have a frequency of 360 Hz., that is, will repeat itself during each 60° of the a-c input voltage. Accordingly, it will be seen that that portion of the ripple voltage which lowers the net oscillator input signal to below its average value and thereby causes integrator 72 to integrate slower than its average rate during part of its 60° integrating cycle is compensated for by that portion of the ripple voltage which raises the net oscillator input signal to above its average value, and thereby causes integrator 72 to integrate faster than its average rate during the remainder of its 60° integrating cycle. Moreover, this ripple voltage immunity is maintained over a wide range of input frequencies since the angular duration of the ripple voltage cycle and the angular duration of the integrating cycle are both 60° of the input voltage over a wide range of input frequencies. As a result, the control system of the invention can be constructed without the heavy filtering which can degrade system performance and give rise to control system instabilities.

THE OR-ING AND PHASE-LIMITING CIRCUITRY OF FIG. 6

In accordance with the present invention, the voltage control pulse generated by voltage oscillator 28 may or may not be able to initiate a control pulse at C and thereby initiate a transition in the control waves generated by wave generator 13. This is because the ability of a VCS pulse to initiate a control pulse at C depends upon whether that VCS pulse occurs prior to the corresponding CCS pulse and also upon whether that VCS pulse bears a permissible phase relationship to the reference signal. Similarly, the CCS pulse generated by current oscillator 43 may or may not be able to initiate a control pulse at C. This is because the ability of a CCS pulse to initiate a control pulse at C depends upon whether that CCS pulse occurs prior to the corresponding VCS pulse and also upon whether the CCS pulse bears a permissible phase relationship to the reference signal.

If, for example, the first occurring one of the VCS and CCS pulses should occur at a time when the control pulse which would be initiated thereby would follow the normally preceeding reference pulse and preceed the normally following reference pulse, that pulse will propagate through OR-ing network 45 and phase limiting network 32 of FIG. 1 and initiate a control pulse at C. If, on the other hand, the first occurring one of those pulses should occur too soon, that is, at a time when a control pulse initiated thereby would preceed the normally preceeding reference pulse, that pulse will be prevented from initiating a control pulse at C and the latter pulse will, instead, be initiated at a later time by the normally preceding reference pulse. If, alternatively, the first occurring one of the VCS and CCS pulses should attempt to occur too late, that is, at a time when a control pulse initiated thereby would follow the normally following reference pulse, the pulse will again be prevented from initiating a control pulse at C and the latter pulse will, instead, be initiated at an earlier time by the normally following reference pulse. Thus, generally speaking, one of the oscillator output pulses will ordinarily propagate through the circuitry of FIG. 6 to initiate a control pulse, but, if the first occurring one of the VCS and CCS pulses should occur outside of the angular reference window defined by the normally preceeding and normally following reference pulses, the control pulse will be initiated by the reference pulse at the leading or trailing edge of that window, that is, by the transitions of the reference signal. As a result, the control signal at C is constrained to occur within 0° to 60° of lag behind the reference signal.

The OR-ing and phase-limiting circuitry which imposes these relationships on the reference and the voltage and current control signals will now be described.

a. OR-ing Network 45

In the present embodiment OR-ing network 45 includes monostable multivibrators 153, 154 and 155 each having a triggering input a and first and second complementary outputs c and d. Multivibrators 153 and 154 are similar to each other and each is arranged to produce positive and negative output pulses at outputs c and d thereof, respectively, when a low-to-high transition occurs at input a thereof. Multivibrator 155 is also similar except that it is triggered by a negative transition at input a thereof. OR-ing network 45 also includes flip-flops 156 and 157 and gates 159, 160 and 161. As previously described in connection with FIG. 1, OR-ing network 45 serves to generate at output 45c thereof a series of OCS pulses each pulse of which is derived either from a voltage control pulse or from a current control pulse depending upon which of the latter pulses occurs first, following the immediately preceeding OCS pulse.

Assuming, for example, that following the appearance of an OCS pulse at OR-ing output 45c, a VCS pulse appears at input 45a prior to the appearance of a CCS pulse at input 45b, the positive transition of that VCS pulse will cause a positive pulse to appear at multivibrator output 153c. The coincidence of the latter pulse with the normally high state voltage at multivibrator output 155d will cause a low state pulse to appear at output c of gate 159. The last-named pulse, in turn, is applied to input a of gate 160 and causes a positive OCS pulse to appear at output c of gate 160 and at OR-ing network output 45c. Thus, when a VCS pulse occurs prior to a CCS pulse, the VCS pulse propagates through OR-ing network 45 to produce an OCS pulse.

Assuming, on the other hand, that following the appearance of an OCS pulse, a CCS pulse appears at OR-ing network input 45b prior to the appearance of a VCS pulse at OR-ing network input 45a, a positive pulse will appear at output c of multivibrator 154. The coincidence of this pulse with the normally high state voltage at multivibrator output 155d will cause a low state pulse to appear at output c of gate 161. The last-named pulse, in turn, is applied to input b of gate 160 and causes a positive OCS pulse to appear at output c of gate 160 and at OR-ing network output 45c. Thus, when a CCS pulse occurs prior to a VCS pulse, the CCS pulse propagates through OR-ing network 45 to initiate an OCS pulse.

To the end that the propagation of the first occurring one of the voltage and current control pulses through OR-ing network 45 prevents the propagation through network 45 of the later occurring one of those pulses, multivibrator 155 is connected between output c of gate 160 and the b inputs of gates 159 and 161. This multivibrator assures that as each OCS pulse is initiated by the first occurring one of the voltage and current control pulses, an inhibit pulse which is longer than the speed-up time of oscillators 28 and 43 is applied to gates 159 and 161 to block the propagation of the later occurring one of those pulses. Thus, each set of voltage and current control pulses produces only one OCS pulse and that OCS pulse is derived from the pulse produced by the faster running one of oscillators 28 and 43.

In order to assure that no extraneous OCS pulses are generated by network 45, it is desirable that, upon the generation of each OCS pulse, both oscillators be re-started at the beginning of their respective integrating cycles. In the present environment, this restarting is accomplished by forcing current oscillator 43 to fire each time that a VCS pulse initiates an OCS pulse and by forcing voltage oscillator 28 to fire each time that a CCS pulse initiates an OCS pulse. The circuitry which accomplishes this restarting includes flip-flops 156 and 157 and inverting gates 163 and 164 in FIG. 6 and speed-up networks 47 and 48 in FIGS. 1 and 5.

Assuming that a VCS pulse is applied to OR-ing network 45 prior to the companion CCS pulse, the resulting low state pulse output c of gate 159 will reset flip-flop 157 and thereby cause inverting gate 48 of current a low state voltage to speed-up network 48 of current oscillator 43. Under this condition, FET 48a thereof will conduct to substantially increase the level of current applied to oscillator input 43a. As a result, oscillator 43 will run through the remaining portion of its integrating cycle at a greatly increased rate, causing a CCS pulse to be applied to OR-ing network input 45b during the time when multivibrator 155 is still inhibiting gate 161. It will, therefore, be seen that the CCS pulse will be unable to initiate an extraneous OCS pulse. Thus, each time that a VCS pulse initiates an OCS pulse, current oscillator 43 is forced substantially into step with voltage oscillator 28.

It will be understood that when a CCS pulse initiates an OCS pulse prior to the occurrence of the companion VCS pulse, voltage oscillator 28 is forced substantially into step with current oscillator 43, this being accomplished in a manner similar to that just described in connection with the force-firing of current oscillator 43.

When voltage oscillator 28 is force-fired by the action of current oscillator 43, I have found it desirable to have an inverting gate 165 connected between output d of flip-flop 156 and hold network 49, through an inverting gate 172. In this configuration, gates 165 and 172 assure that FET 49a of hold network 49 turns off and thereby disconnects summing junction J1 from voltage oscillator input 28a during the operation of speed-up network 47. In this manner, the speed-up of oscillator 28 is free of any potential interference caused by opposing signals at junction J1.

b. Phase Limiting Network 32

Figure 6:
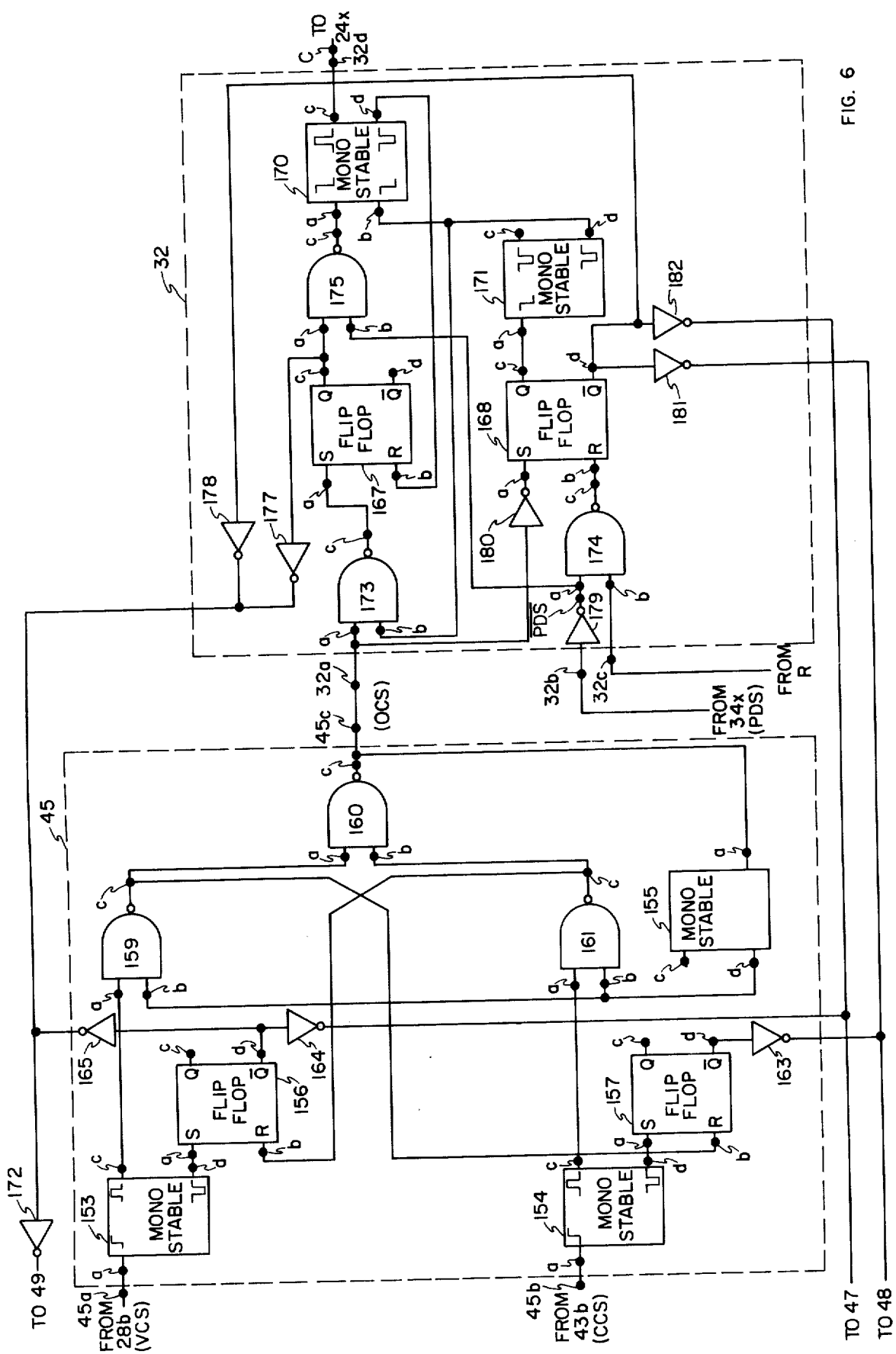

In the present embodiment, the phase limiting circuit 32 which imposes the desired 60° angular limits on the relationship between the control and reference signals is shown in FIG. 6 and includes flip-flops 167 and 168, monostable multivibrators 170 and 171, gates 173, 174 and 175, and inverting gates 177 through 182. The waveforms of the voltages which typically appear at inputs 32a, 32b and 32c and output 32d of phase limiting network 32 are shown in FIG. 6a.

Figure 6A:
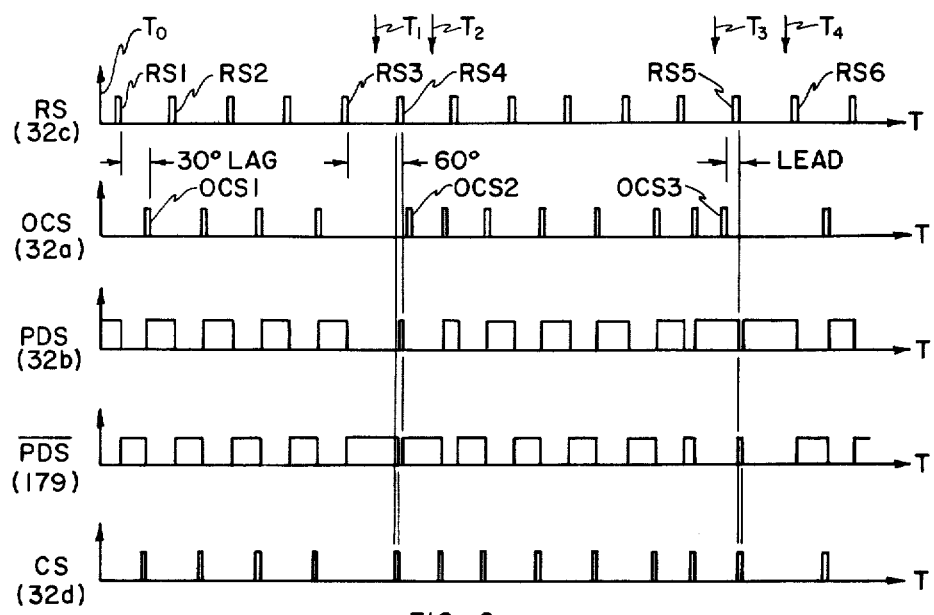

When the control system is operating in its preferred mode, each oscillator control pulse such as OCS1 at input 32a is normally preceeded by a reference pulse such as RS1 and is normally followed by a reference pulse such as RS2 at input 32c, as shown between times $T_0$ and $T_1$ in FIG. 6a. Also shown in FIG. 6a, is phase difference signal $\overline{PDS}$, the complement of phase difference signal PDS which is applied to phase limiting network input 32b. The importance of phase difference signal $\overline{PDS}$ stems from the fact that it is in its high state between the time of each negative transition of reference signal RS and the time of the next occurring negative transition of control signal CS. As a result, if a reference pulse should occur when signal $\overline{PDS}$ is already in its high state, or, if an OCS pulse should occur when signal $\overline{PDS}$ is already in its low state, it is known that an OCS pulse has occurred outside of the desired angular reference window.

Assuming, as shown in FIG. 6a, that oscillator control pulse OCS1 occurs within the angular reference window defined by normally preceeding and following reference pulses RS1 and RS2, the positive transition thereof combines with the normally high state voltage at output d of monostable 171 to initiate a negative transition at output c of gate 173. The latter transition, in turn, sets flip-flop 167 to apply a positive transition to input a of gate 175. Because, at this time, no control pulse has occurred to send phase difference signal $\overline{PDS}$ to its low state, a negative transition appears at output c of gate 175. Since monostable 170 is a device which produces a high state pulse at output c thereof when a negative transition appears at either input a or b thereof, the negative transition at output c of gate 175 results in the appearance of a pulse at junction C. Thus, given the assumed permissible phase relationship between oscillator control signal OCS and reference signal RS, phase limiting network 32 allows pulse OCS1 to propagate through itself and initiate a pulse at junction C.

At the same time that monostable 170 applies a positive pulse to junction C, it also applies a negative transition to input b of flip-flop 167, to reset the same. After monostable 170 completes its pulse, flip-flop 167, gate 175 and monostable 170 are in the condition which they were in before pulse OCS1 and, are, therefore, ready for the next switching sequence. Also playing a part in establishing a ready condition in network 32 is the positive transition of pulse OCS1. This transition propagates through inverting gate 180 to apply a negative transition to input a of flip-flop 168 and thereby assure that that flip-flop is set. This set condition is desirable since it assures that flip-flop 168 is ready to be reset, if such should be necessary to the production of the next control pulse as, for example, if the next control pulse has to be initiated by a transition of the reference signal rather than by a transition of the oscillator control signal.

It will be understood that control pulses will be initiated by signal OCS, in the above described manner, so long as the angle $\phi$ by which signal OCS lags the reference signal does not exceed the limits 0° to 60°. In other words, so long as each OCS pulse occurs between 0° and 60° of lag behind the nearest preceeding reference pulse, that OCS pulse will propagate through network 32 to initiate a control pulse at junction C and leave network 32 ready to respond to the next OCS pulse.

If an OCS pulse, such as OCS2 in FIG. 6a, should attempt to occur after the normally following reference pulse, such as RS4 in FIG. 6a, phase limiting network 32 will initiate a control pulse in accordance with that normally following reference pulse and not in accordance with that OCS pulse. In other words, under an attempted excessive phase lag condition, the desired control pulse will be generated in accordance with the trailing edge (RS4) of the angular reference window defined by normally preceeding and following reference pulses RS3 and RS4. This assumption of control by the reference signal assures that no significant or activity initiating transition of the control signal can lag more than 60° behind the nearest preceeding significant transition of the reference signal and thereby assures that no control voltage wave can lag more than 60° behind the corresponding a-c input voltage wave.

Assuming, for example, as shown in FIG. 6a, that the significant or positive transition of normally following reference pulse RS4 occurs before the significant or positive transition of pulse OCS2, the positive transition of pulse RS4 will appear at input 32c of network 32 prior to the time that pulse OCS2 produces a positive transition at input 32a thereof. Since the negative transition of the control signal has not yet occurred and, therefore, not yet established the low state of signal $\overline{PDS}$, the output of gate 179 will at this time be in its high state. As a result, upon the positive transition of RS4, a negative transition will occur at output c of gate 174 to reset flip-flop 168 and thereby apply a negative transition to input a of monostable 171. The latter transition, in turn, initiates a low state pulse at output d of monostable 171 to trigger monostable 170 via input b thereof. The triggering of monostable 170, in turn, establishes at output c thereof and at C a positive pulse which comprises the desired control pulse. Thus, when a normally following reference pulse such as RS4 proceeds the associated OCS pulse such as OCS2, a control pulse is initiated by the reference signal rather than by the oscillator control signal.

In order to prevent the later occurring pulse OCS2 from energizing monostable 170 shortly after the generation of a control pulse thereby, monostable output 171d is connected to input b of gate 173 to prevent signal OCS2 from propagating through to flip-flop 167 and monostable 170. This inhibiting action does not, however, prevent the positive transition of pulse OCS2 from setting flip-flop 168, via inverting gate 180, and thereby restoring flip-flop 168 to a condition in which it is ready to respond to later occurring reference pulses. Thus, after the reference signal initiates a control pulse at C, the circuitry of FIG. 6 is ready to respond to the next occurring set of reference, oscillator control and phase difference signals applied thereto.

When, during the above described switching sequence, reference pulse RS4 resets flip-flop 168, low state voltages appear at the outputs of inverting gates 181 and 182. These low state voltages are applied to the gates of FETS 47a and 48a of speed-up networks 47 and 48 of FIGS. 1 and 5 to greatly increase the rate at which the voltage and current oscillators run through the remainder of their integrating cycles to generate VCS and CCS pulses. As a result, voltage and current oscillators 28 and 43 are forced to produce output pulses relatively soon after the occurrence of reference pulse RS4, that is, at a time when the inhibit condition in gate 173 prevents those pulses from initiating extraneous control pulses at C. This speed-up also advances the phase position of oscillators 28 and 43 with respect to the reference signal and thereby gives those oscillators a fresh opportunity to avoid exceeding the 60° angular limit upon the conclusion of their next integrating cycles.

If, the significant or positive transition of an OCS pulse, such as OCS3 in FIG. 6a, should occur before the significant or positive transition of the normally preceeding reference pulse, such as RS5 in FIG. 6a, network 32 will initiate a control pulse in accordance with that normally preceeding reference pulse and not in accordance with that OCS pulse. In other words, under an attempted phase lead condition, the desired control pulse will be generated in accordance with the leading edge (RS5) of the respective angular reference window defined by normally preceeding and normally following reference pulses RS5 and RS6. This condition assures that control signal CS cannot lead reference signal RS, i.e., assures that no control pulse at C can lag the nearest preceeding reference pulse by less than 0°. The latter condition, in turn, assures that no control voltage wave can lead the corresponding a-c input voltage wave.

Assuming, as shown in FIG. 6a, that pulse OCS3 occurs prior to the normally preceeding reference pulse RS5, the positive transition of pulse OCS3 will establish a negative transition at the output c of gate 173 to set flip-flop 167 and thereby establish a high state voltage at output c thereof. The latter high state voltage cannot, however, trigger monostable 170 and thereby initiate a control pulse. This is because, under this condition, gate 175 is inhibited, phase difference signal $\overline{PDS}$ at the output of gate 179 being in its low state as a result of not yet having been sent to its high state by the negative transition of reference pulse RS5. Thereafter, when the negative transition of reference pulse RS5 causes a positive transition in signal $\overline{PDS}$, gate 175 is enabled to apply a negative transition to input a of monostable 170 and thereby initiate a control pulse at C. Thus, when an OCS pulse such as OCS3 occurs prior to the normally preceeding reference pulse such as RS5, the control pulse is initiated by the significant (in this case negative) transition of the reference signal rather than in accordance with the significant transition of the oscillator control signal. As a result, no control pulse at junction C can lead the normally preceeding reference pulse at junction R.

At the end of the last described switching sequence, flip-flops 167 and 168 are in a condition in which they are ready to respond to the next occurring set of signals at inputs 32a, 32b and 32c. In particular, flip-flop 167 is reset by the negative edge of the pulse which appears at output d of monostable 170 upon the generation of a control pulse at C. In addition, flip-flop 168 does not need to be set to place it in its ready condition since it was not reset by the reference pulse at input 32c. The latter is because, under the assumed condition, signal $\overline{PDS}$ at input a of gate 174 was low at the time when the negative transition of reference pulse RS5 was applied to input b thereof, thus assuring an uninterrupted high state voltage at output c of gate 174.

During that portion of the last described switching sequence when flip-flop 167 is set, it is desirable to apply a hold signal to FET 49 to prevent voltage oscillator 28 from proceeding through its integrating cycle. This is because the application of a hold signal retards the phase position of the voltage oscillator and thereby allows it to fall into synch with the reference signal. To the end that this may be accomplished, an inverting gate 177 is connected between output c of flip-flop 167 and hold network 49 of FIG. 1 through inverting gate 172. In this configuration, gates 172 and 177 assure that hold FET 49a does not conduct during those times when flip-flop 167 is set. Since, in addition, flip-flop 167 is reset by monostable 170 at the same time that a control pulse is applied at junction C, it will be seen that oscillator 28 is released to begin its integrating cycle, at the beginning thereof, at a time when it has a fresh opportunity to establish a suitable phase relationship with the reference signal.

An inverting gate 178 may also be connected between output d of flip-flop 168 and inverting gate 172 to turn off hold FET 49a during those times when oscillator 28 is being speeded-up (forced to fire) by the action of flip-flop 168 and gate 182 on the speed-up network 47 of oscillator 28.

In view of the foregoing, it will be seen that phase limiting network 32 allows each OCS pulse to initiate a control pulse so long as each OCS pulse occurs within an angular window of approximately 0° to 60° of lag behind the nearest preceeding reference pulse. Phase limiting network 32 also initiates control pulses in accordance with the normally preceeding or normally following reference pulses when an OCS pulse occurs before the normally preceeding or after the normally following reference pulse, respectively. These angular relationships, in turn, assure that each control pulse occurs substantially within a respective angular reference window defined by a respective pair of pulses of the reference signal and that the control voltage waves generated by wave generated 13 remain within 0° and 60° of lag behind the corresponding a-c input voltage waves.

THE DAMPING CIRCUITRY OF FIGS. 1 AND 5

As previously described, it is desirable that the rate of change of the phase angle between the a-c input voltage waves at terminals A, B and C and the control voltage waves at terminals A', B' and C' be limited to a value which assures both the stability of the control system and good dynamic response to sudden changes in input voltage and/or output current. The manner in which the rate of change of this phase angle is limited will now be described. In the present illustrative embodiment, the desired limit in the rate of change of phase angle $\phi$ is imposed by means of a damping signal which is applied to the inputs of oscillators 28 and 43 through respective a-c coupling networks. More particularly, an a-c coupling network comprising a capacitor 36 and a resistor 37 is connected between the output 34y of phase difference detector 34 and summing junction J1 of voltage oscillator 28 to apply thereto a damping signal which varies in accordance with phase difference signal $\overline{PDS}$. A similar damping signal is applied to current oscillator 43 through an a-c coupling network comprising a capacitor 36a and a resistor 37a connected between phase difference detector output 34y and summing junction J2 of current oscillator 43.

As will be described more fully presently, the damping signal applied to oscillator 28 through capacitor 36 and resistor 37 serves, on a transient basis, to oppose the effect of changes in the signal which voltage sensor 30 applies to oscillator 28 and thereby causes the accompanying change in the phase angle $\phi$ to be spread over several integrating cycles of oscillator 28. The damping signal applied to oscillator 43 through capacitor 36a and resistor 37a serves a similar purpose with respect to current oscillator 43 and the effect of changes in the signals applied to oscillator 43 by current sensor 39.

Because, as shown in FIG. 6a, phase difference signal $\overline{PDS}$ has a duty cycle which varies from 0% to 100% as the angle by which the control waves lag the a-c input voltage waves varies from 0° to 60°, and because summing junction J1 is maintained at or near the potential of the control system ground by the action of amplifier 66', the average value of the voltage across capacitor 36 (see $V_{avg}$ in FIG. 5a) is proportional to the duty cycle of signal $\overline{PDS}$ and, therefore, proportional to phase angle $\phi$. Under steady-state conditions, the effect of the current which flows through capacitor 36 toward oscillator 28 when the instantaneous value of signal $\overline{PDS}$ is greater than the average value thereof is cancelled by the effect of the current which flows through capacitor 36 away from oscillator 28 when the instantaneous value of signal $\overline{PDS}$ is less than the average value thereof. As a result, under steady-state condition, the damping signal applied to oscillator 28 through capacitor 36 and resistor 37 has no effect on the overall operating frequency of oscillator 28.

Referring to FIG. 5a wherein is shown the output voltage $V_{72}'$ of integrator 72' of FIG. 5 and its relationship to signals $\overline{PDS}$, RS, CS and VCS, the dotted line depicts the output voltage of amplifier 72' in the absence of capacitor 36 and resistor 37, while the solid line depicts the output voltage of amplifier 72' in the presence of those elements. Therein, it will be seen that when the instantaneous value of signal $\overline{PDS}$ is less than its average value $V_{avg}$, e.g., between times $T_1$ and $T_2$, the direction and rate of the integration performed by amplifier 72' is determined by the sum of the positive signal current $I_{30c}$ produced by voltage sensor 30 and the negative instantaneous damping current produced by signal $\overline{PDS}$. Since the damping current is negative and is greater than positive signal current $I_{30c}$, the net oscillator input current is negative and the rate of integration is determined by the difference between these currents. Under this condition, oscillator 28 may be said to be progressing at a slower than normal rate toward the completion of its integrating cycle.

Similarly, during the time when the instantaneous value of signal $\overline{PDS}$ exceeds its average value, e.g., between times $T_2$ and $T_4$, both signal current $I_{30c}$ and the instantaneous damping current are positive, causing the net oscillator input current to be positive and causing the rate of integration to be determined by the sum of the signal and damping currents. Under this condition, oscillator 28 may be said to be progressing at a faster than normal rate toward the completion of its integrating cycle.

Over the course of a complete integrating cycle, however, the oscillator slow-down produced during interval $T_1 - T_2$, as a result of a subtractive relationship between the signal current and the damping current, is compensated for by the oscillator speed-up produced during interval $T_2 - T_4$, as a result of the additive relationship between the signal current and the damping current. In other words, under steady-state conditions, the integrating cycle of amplifier 72' will begin and end at the same time in the presence of signal $\overline{PDS}$ that it would begin and end in the absence of that signal. Thus, the application of damping signal $\overline{PDS}$ through capacitor 36 and resistor 37, has no effect on the steadystate operating frequency of oscillator 28.

It should be noted that the novel characteristics which allow the integrator 72' to produce the voltage waveform shown in FIG. 5a result from the oscillator structures discussed in detail in connection with FIGS. 2 and 5. As previously described, these novel characteristics include the ability of integrator 72' to drive its output voltage away from both integrating limits, i.e., the ability of the integrator output voltage to attain, vary outside of and recross an integrating limit, without interfering with the progress of an integrating cycle. See, for example, time interval $T_1 - T_2 - T_5$ in FIG. 5a. Thus, an oscillator such as oscillator 28 is particularly suitable for use with a damping signal such as $\overline{PDS}$.

If, under the above assumed steady-state condition, the output voltage at terminals 11a and 11b should suddenly decrease, the magnitude of analog voltage control signal $I_{30c}$ will also abruptly decrease to reduce the net signal current flowing into summing junction J1 and thereby temporarily decrease the operating frequency of oscillator 28. The latter decrease, in turn, will tend to cause phase angle $\phi$ to increase, to increase the current flow through inductances 12A, 12B and 12C, and thereby restore the regulator output voltage to the desired value. Any increase in phase angle $\phi$ will, however, due to the digital manner in which signal $\overline{PDS}$ is generated, immediately be reflected by an increase in the duty-cycle of signal $\overline{PDS}$ and by the gradual charging of capacitor 36 to a higher average value. In the course of charging to this higher average voltage, capacitor 36 will conduct current into oscillator 28 to speed-up the same and thereby oppose the change in the phase angle necessitated by the decrease in signal $I_{30c}$. Assuming that capacitor 36 requires several integrating cycles to charge to its new, higher average voltage, the opposition which capacitor 36 provides to the required increases in phase angle $\phi$ will require several integrating cycles to exhaust itself. As a result, the increase in angle $\phi$ called for by the assumed decrease in output voltage will be spread over several integrating cycles of integrator 72'.

If, on the other hand, under the above steady-state conditions, the output voltage at terminals 11a and 11b should increase abruptly, the magnitude of analog voltage control signal $I_{30c}$ will also abruptly increase to increase the net signal current into junction J1 and thereby advance the phase of oscillator 28 with respect to the reference signal. Under this condition also, the damping signal $\overline{PDS}$ applied to oscillator 28 through capacitor 36 and resistor 37 will limit the rate of change of the phase angle $\phi$ as the latter decreases to counteract the increase in output voltage. In this event, however, the average voltage across capacitor 36 will be decreasing toward a lower value which reflects the accompanying decrease in the duty cycle of signal $\overline{PDS}$.

It will be understood that the a-c coupling network comprising capacitor 36a and resistor 37a utilizes damping signal $\overline{PDS}$ to impose a similar limit upon the rate of change of the phase position of current oscillator 43. This allows the rate of change of phase angle $\phi$ to be limited when current oscillator 43 initiates control pulses at junction C as well as when voltage oscillator 28 initiates these control pulses. This does not, however, imply that the time constants of coupling networks 36–37 and 36a–37a must be equal or that coupling network 36a –37a may not be omitted under suitable conditions.

As implied in FIG. 5a, it is desirable that the change in current resulting from a change of state in the damping signal be on the order of three to ten times the magnitude of the typical bias current of oscillator 28. This relatively large damping ratio assures that the damping signal has a strong ability to affect the dynamic characteristics of the oscillator. In addition, it is desirable that the gain of the control system (e.g., via resistor 141 in sensor 30) be set at a value which is relatively high with respect to that of previously available control systems. This relatively high gain assures that the control system will force the control system variables toward their new equilibrium values at a relatively high rate. Together, however, the high damping ratio and high gain complement each other to provide both relatively fast dynamic response and high system stability. This follows since the high gain causes the system to approach its new equilibrium condition at a relatively high rate while the high damping ratio assures system stability, i.e., prevents the system from oscillating on either the approach to or the attainment of those new equilibrium values.

In utilizing the relatively high damping ratio and the relatively high system gain together, I have found that the most effective results are obtained when the damping signal is one which has a digital form and which instantaneously reflects changes in phase angle $\phi$. In other words, it is desirable that the damping signal be generated in a manner which causes it to reflect changes in angle $\phi$ at the very instant that they occur or at least at some time before they affect the output voltage of the regulator circuit. In generating the damping signal in digital form this instantaneous response is most easily obtainable. It will be understood, however, that an analog damping signal could be utilized if it could be generated on a substantially instantaneous basis.

Another advantage of utilizing a digital damping signal is that it allows that damping signal to be locked in phase with the output voltage of the integrating network within each controllable oscillator. Referring to FIG. 5a, for example, it will be seen that the negative transitions of damping signal $\overline{PDS}$ coincide with times such as T1 and T4 at which integrator 72' produces an output pulse. In addition, the positive transitions of signal $\overline{PDS}$ coincide with the times such as $T_2$ at which integrator output voltage $V_{72}'$ stops varying away from both integrating limit V+ and integrating limit V−. Thus, a digital damping signal such as $\overline{PDS}$ is particularly suitable for use with an oscillator having the characteristics of oscillators 28 and 43.

It will be understood that in particular regulator circuit embodiments, it may be desirable to provide a-c coupling networks such as 36–37 for circuit variables other than phase difference signal $\overline{PDS}$. A capacitor 40 and a resistor 41 may, for example, be connected between output $c$ of non-inverting amplifier 145 of of current sensor 39 and junction J1 to apply to oscillator 28 a damping signal that varies in accordance with the output current of the circuit of FIG. 1. In general, a-c coupling networks such as 36–37 may be utilized in connection with any other circuit variable with respect to which the regulator circuit of FIG. 1 has a tendency to become unstable.

THE EMBODIMENTS OF FIGS. 7 AND 8

In the embodiment of the invention shown in FIG. 1, OR-ing network 45 and the phase limiting network 32 were shown and described as separate and successively functioning circuit networks. It is, however, not essential to the practice of the invention that the functions of these networks be performed separately or in succession. FIG. 8 shows a schematic diagram of an embodiment of the invention in which the OR-ing function of network 45 and the phase limiting function of network 32 of FIG. 6 are served by a single OR-ing/phase limiting network 33 having both of these functions. The relationship of network 33 to the remaining control circuitry of the invention is shown in the block diagram of FIG. 7. In comparing FIGS. 6 and 8 and FIGS. 1 and 7, it will be seen that the signals applied to the inputs and the signals produced at the outputs of OR-ing/phase limiting network 33 of FIG. 8 are substantially the same as those indicated for OR-ing network 45 and phase limiting network 32 of FIG. 6 and that the circuitry of FIG. 7 is the same as that of FIG. 1, except for the substitution of the circuitry of FIG. 8 for the circuitry of FIG. 6.

The operation of OR-ing/phase limiting network 33 of FIG. 8 will now be described. When the VCS pulse generated by voltage oscillator 28 occurs within the 60° reference window defined by the normally preceeding and following reference pulses, signal $\overline{PDS}$, at the output of inverting gate 196, will be in its high state. Under these conditions, the negative transition of the VCS pulse will fire a monostable 190 via input $a$ thereof to establish a positive pulse of predetermined duration at output $c$ thereof. The positive transition of the latter pulse together with the normally high state voltage at output $d$ of a monostable 193 will establish a negative transition at the output of gate 192. The last-named transition, in turn, will set a flip-flop 194 to establish a high state voltage at output $c$ thereof. The positive transition of the latter voltage will, in turn, combine with the previously mentioned high state voltage at the output of inverter 196 to initiate a negative transition at the output of gate 195. Since, at this time, the low state of the reference signal is causing gate 199 to apply a high state voltage to input $b$ of a gate 197, the negative transition at the output of gate 195 will produce a positive transition at the output of gate 197. The latter transition, in turn, is inverted by an inverting gate 200 to apply a negative transition to alternate input $a$ of a monostable 193 and thereby initiate a positive pulse of predetermined duration at output $c$ thereof and a negative pulse of similar duration at output $d$ thereof.

The positive one of these output pulses triggers a monostable 201 to initiate a control pulse at junction C and thereby initiate a transition in the control waves generated by network 13. The negative one of these pulses, on the other hand, is fed back through a conductor 203 to reset flip-flop 194 and thereby condition the same for receiving the next occurring VCS pulse. The negative pulse on conductor 203 also serves to inhibit gates 192 and 204 and thereby prevent any immediately following oscillator control pulses from initiating extraneous control pulses at junction C. Thus, when a VCS pulse occurs between the normally preceeding and the normally following reference pulse, it initiates a control pulse at junction C and leaves the circuitry of FIG. 8 in condition to receive the next normally occurring VCS pulse.

In the event that the VCS pulse should occur before the normally preceeding reference pulse, that VCS pulse will occur at a time when signal $\overline{PDS}$ is still in its low state. Accordingly, the VCS pulse will set flip-flop 194 in the manner previously described, but will be unable to propagate through gate 195 due to the low state voltage ($\overline{PDS}$) which gate 196 applies to input $b$ of gate 195. Under this condition, no control pulse will appear at junction C until the next occurring or normally preceeding reference pulse causes signal $\overline{PDS}$ to assume its high state to enable gate 195 and thereby initiate a control pulse through gate 197, inverter 200 and monostables 193 and 201, in the manner previously described. Thus, when a VCS pulse occurs before the normally preceeding reference pulse, no control pulse appears at junction C until there occurs the reference pulse which the Vcs pulse preceeded. In other words, when the voltage control signal attempts to lead the reference signal, the control pulse at C is produced by the reference signal rather than by the voltage control signal.

In the event that the VCS pulse occurs after the normally following reference pulse, that reference pulse will occur while signal $\overline{PDS}$ is still in its high state, a control pulse at C not yet having occurred to send signal $\overline{PDS}$ to its low state. Under this condition, when the reference pulse sends input $b$ of gate 199 to its high state, a negative transition will appear at output $c$ of gate 199 and thereby initiate a positive transition at the output of gate 197. The latter transition will, in turn, initiate a control pulse at junction C through inverter 200 and monostables 193 and 201 even though a VCS pulse has not yet occurred. In addition, the accompanying low state pulse at output $d$ of monostable 193 will inhibit gate 192 and thereby prevent the VCS pulse from initiating an extraneous control pulse at C when it does occur. Thus, in the event that a VCS pulse occurs after the normally following reference pulse, i.e., lags the nearest preceeding reference pulse by more than 60°, the control pulse at junction C will be initiated by a transition of the reference signal and not by a transition of the voltage control signal.

In view of the foregoing, it will be seen that if a VCS pulse occurs outside of the reference window defined by the normally preceeding and normally following reference pulses, a control pulse at C will be initiated by the leading or trailing edge of the reference window rather than in accordance with the VCS pulse. Thus, under no condition, can the control pulse at junction C lag the nearest preceeding reference pulse at junction R by an angle less than 0° or greater than 60°.

The operation of OR-ing/phase limiting network 33 in the presence of CCS pulses from current oscillator 43 is in many respects the same as that just described in connection with the VCS pulses. Assuming, for example, that each CCS pulse occurs prior to the companion VCS pulse, each such CCS pulse will initiate the desired control pulse at junction C through a monostable 203 which has a function similar to that of monostable 190, through gate 204 which has a function similar to that of gate 192, through a gate 206 which has a function similar to that of gate 197, through an inverter 207 which has a function similar to that of inverter 200 and, via alternate input b of monostable 193, through monostables 193 and 201. Thus, the ability of the circuit of FIG. 8 to generate the desired control pulses in accordance with either the voltage control signal or the current control signal stems from the fact that monostable 193 has alternative inputs a and b, the energization of either one of which can initiate a control pulse at junction C.

In the circuit of FIG. 8, the switching circuitry through which a CCS pulse propagates to input b of monostable 193 does not include devices corresponding to flip-flop 194 and gate 195 of the switching circuitry through which a VCS pulse propagates to input a of monostable 193. The absence of these corresponding devices reflects the fact that, for current limiting purposes, it is ordinarily desirable to eliminate the components such as flip-flop 194 and gate 195 which prevent the leading condition. It will be understood, however, that if it were necessary to prevent such a leading condition, devices such as flip-flop 194 and gate 195 could be added to the current control switchtrain of FIG. 8 to accomplish such prevention.

As previously described in connection with the OR-ing and phase limiting circuitry of FIG. 6, it is desirable that the earlier occurring one of the voltage and current control pulses restart and oscillator which generates the later occurring one of those pulses. This restarting action assures that both oscillators begin their next integrating cycles at substantially the beginnings thereof. In the circuit of FIG. 8, this restarting action is provided by flip-flops 208 and 209 and the connections thereof to oscillator speed-up networks 47 and 48 of FIG. 7.

Assuming, for example, that a VCS pulse initiates a control pulse prior to the occurrence of the associated CCS pulse, the accompanying negative transition at the output of inverter 200 will be fed back through a conductor 211 to reset flip-flop 209. The low state voltage which is caused to appear at output c of flip-flop 209 as a result of this transition, in turn, turns on speed-up FET 48a. Under this condition, current oscillator 43 will be sped-up and thereby forced to produce a CCS pulse within a relatively short time thereafter to trigger monostable 203. The resulting high state pulse at output c of monostable 203 will, however, be unable to initiate an extraneous control pulse at C because at that time monostable 193 is still applying a negative, inhibiting voltage to gate 204. In addition, the accompanying negative transition at the output d of monostable 203 will set flip-flop 209 to turn off the speed-up and restore that flip-flop to a condition in which it can respond to the next negative transition at the output of gate 200. Thus, when voltage oscillator 28 initiates a control pulse at junction C, current oscillator 43 is forced to fire and is restarted at the beginning of its integrating cycle at a time when the resulting CCS pulse cannot initiate an extraneous control pulse at junction C.

Flip-flop 208 serves a function similar to that of flip-flop 209 in that it speeds up and force fires voltage oscillator 28 when the current oscillator completes its integrating cycle and initiates a control pulse at C prior to the occurrence of the associated voltage control pulse. To this end, the output of gate 207 is connected in resetting relationship to flip-flop 208, through a conductor 213, and output c of flip-flop 208 is connected to speed-up network 47 of voltage oscillator 28.

It will be understood that a conductor 215 which connects output c of flip-flop 194 to FET 49a of hold network 49 of FIG. 7 serves a function similar to that described in connection with the corresponding hold structure in FIGS. 1 and 6.

In view of the foregoing description of FIG. 8 and the equivalent structure in FIG. 6, it will be seen that it makes no difference whether the OR-ing and the phase limiting functions of the control system of the invention are performed successively or simultaneously. Because, however, of the smaller number of components present in the circuit of FIG. 8, it is believed that the latter circuitry is commercially preferable to the circuitry of FIG. 6.

THE EMBODIMENT OF FIGS. 9 and 10

As stated previously in connection with FIGS. 7 and 8, it is unimportant whether the OR-ing and phase limiting functions of the circuit of the invention are performed simultaneously or separately. As will be described more fully in connection with FIGS. 9 and 10, given that these functions are performed separately, the sequence in which these functions are performed is unimportant. The OR-ing function may, for example, be performed after the oscillators 28 and 43 have performed their pulse generating functions and before the phase limiting function is performed, as shown in FIG. 1, or the OR-ing function may be performed prior to the pulse generating function, as will now be described in connection with FIGS. 9 and 10.

Referring to FIG. 9, there is shown a block diagram of an embodiment of the invention in which the OR-ing function is performed on the analog voltage control signal at 30c and the analog current control signal at 39b, before the latter signals are applied to a single, common control signal generator or common oscillator 220 of the type described in connection with reference oscillator 21. In the embodiment of FIG. 9, the desired OR-ing function is accomplished by diodes 222 and 223, a suitable current sinking resistor 224 and an output resistor 225. The latter resistors are preferably so proportioned, in relation to the signal current supplying ability of amplifiers 139 and 147 of voltage and current sensors 30 and 39, respectively, and to a negative supply voltage $-V_{sink}$ that one of diodes 222 and 223 will conduct even when the more positive one of the voltages at amplifier outputs 139c or 147c is near its most negative value. In addition, the sensor output resistors 143 and 147f of FIG. 4 should be short-circuited so that operational amplifiers 139 and 147 serve as voltage sources for the OR-ing diodes and resistor 225.

When the circuit of FIG. 9 is operating in its voltage control mode, voltage sensor 30 dominates, i.e., produces a more positive output voltage than current sensor 39, causing diode 223 to conduct and diode 222 to be blocked. Under this condition, sensor 30, through diode 223, supplies the current required by sinking resistor 224 and, at the same time, supplies to junction J1, through resistor 225, a signal current sufficient to provide the required control over oscillator 220. One reason why the flow of this sinking current does not interfere with the required flow of oscillator input signal current through resistor 225 is that the voltage at sensor output 30c is generated with respect to the control system ground. Another reason is that the potential of junction J1 is, during the conductive state of hold network 49, held at or near the potential of the control system ground by the operational amplifier at the input of oscillator 220. Accordingly, it will be seen that the oscillator input signal current through resistor 225 is determined substantially by the output voltage of voltage sensor 30.

When, on the other hand, the circuit of FIG. 9 is operating in its current limiting mode, current sensor 39 dominates, i.e., produces a more positive output voltage than voltage sensor 30, causing diode 222 to conduct and diode 223 to be blocked. Under this condition, oscillator 220 is controlled in accordance with the regulator output current rather than the regulator output voltage and the signal current applied to oscillator 220 is, for the reasons stated above, substantially unaffected by the flow of sinking current through resistor 224.

In view of the foregoing, it will be seen that oscillator 220 can switch from voltage control (conduction through diode 223) to current control (conduction through diode 222) and vice-versa, as required, to reflect changes in the dominant regulator output variable. As a result, the control signal at junction C can be initiated either by a voltage control signal or a current control signal. Thus, the circuit of FIG. 9 provides the same OR-ing function described in connection with FIGS. 1 and 6 and in connection with FIGS. 7 and 8, but does so with only one control oscillator 220.

Referring to FIG. 10, there is shown a schematic diagram of a phase limiting circuit 32' suitable for use in connection with the OR-ing and oscillator circuitry of FIG. 9. Phase limiting circuit 32' is similar to OR-ing/phase limiting circuit 33 of FIG. 8, but is simpler than that circuit due to the omission from network 32' of those components which were present in network 33 to afford the desired OR-ing function. In other words, phase limiting network 32' of FIG. 10 is a form of OR-ing/phase limiting circuit 33 in which there have been eliminated the components (197, 200, 203, 204, 206, 207 and 209) that were present therein to accommodate the presence of current oscillator 43. In order to emphasize the similarity of the circuitry of FIGS. 10 and 8, the components of the circuit of FIG. 10 have been labeled with the same numbers used for the corresponding components of the circuit of FIG. 8, with the addition of a prime superscript. Because of this close similarity, the phase limiting operation of network 32' is clear from the previously described operation of network 33 and, accordingly, the operation of phase limiting circuit 32' will not be further described herein. It will be understood that, because of the absence in phase limiting network 32' of an OR-ing characteristic, this phase limiting circuit is also usable in regulator circuitry which is constructed in accordance with the invention but which requires no current limiting characteristic.

CONTROL SYSTEM START UP

In the preceeding description of the invention, no attempt has been made to describe the manner in which, upon starting, the circuit components and networks of the control system are made to assume the operative states and relationships which allow the control system to operate in the manner described. This description of the start up mechanism has been omitted because, on the one hand, it would complicate the drawings and description and thereby de-emphasize the more significant features and circuitry of the invention, and because, on the other hand, such starting circuitry as may be desirable can be added utilizing starting techniques which are well-known to those skilled in the art. For the sake of completeness, however, there follows a brief discussion of how desirable starting characteristics may be afforded.

One well-known and highly effective starting technique which may be utilized to assure that the flip-flops of the control system are in the desired states upon start up is to utilize flip-flops having set-direct ($S_D$) and reset-direct ($R_D$) inputs. The utilization of such flip-flops and the application thereto, upon start up, of signals which will force them into the desired states, prior to applying the control system in control relationship to the circuitry which it controls, assures that the regulator circuit as a whole will "start off on the right foot."

Another well-known starting technique is the utilization of gates which have an input for the application of a start signal. An inverting gate such as inverting gate 179 of FIG. 6, for example, may be replaced by a two input NAND gate, one input of which is supplied with a start signal. This substitution allows the NAND gate to inhibit signal propagation for one state of a start signal applied to the start input thereof, and, upon a change of state of the start signal, allows the NAND gate to function as an inverting gate. Similarly, where necessary, a two input gate may be replaced by a three input gate one input of which is supplied with a start signal. This substitution allows the three input gate to inhibit signal propagation for one state of a start signal applied to the start input thereof and allows the three input gate to function as a two input gate for the other state of that start signal.

Another well-known, more general starting technique involves suppressing the propagation of control signals from the control circuitry to the power circuitry for a time, during start up, to allow any starting transients in the power circuitry to die down and, thereafter, allowing the control signals to propagate from the control circuitry to the power circuitry. This starting technique assures that the inrush currents which flow through the power circuitry upon the initial application of a-c voltage thereto do not cause a circuit malfunction.

Still another starting technique is to apply power to the control circuitry and to allow it to stabilize itself prior to the application of power to the power-handling portion of the circuit.

In more sophisticated control systems, particularly those which have unusually high inrush currents when starting under load, another starting technique is to utilize current and/or voltage "walk-in" circuitry. In a typical control circuit utilizing a current "walk-in" circuit, the control circuitry is arranged to operate initially in its current limiting mode with the level to which the current is limited set at a reduced value and to allow that level to gradually approach its final value. This "walk-in" technique may also be utilized to initially set the regulated output voltage to a reduced value and then gradually allow it to increase to its final value. Circuits of the latter type are known as voltage "walk-in" circuits.

It will be understood that any of the above described starting techniques may be utilized in combination with any one or more of the remaining starting techniques to afford the desired starting characteristics.

SUMMARY

In view of the foregoing, it will be seen that the circuitry of the invention takes into account and provides a direct solution for each of the problems which have limited the utility of phase displacement type voltage regulator circuits. In particular, the disclosed control circuitry takes into account and solves the problem of a-c input voltage frequency variations. The circuitry of the invention also solves the problem of imposing definite angular limits on the relationship of the input and control waves, particularly in the presence of input frequency variations. In addition, the circuitry of the invention provides a solution to the problem of limiting the rate of change of the phase angle between the a-c input and control voltage waves and solves this problem in a manner which actually improves the dynamic response of the regulator circuitry to sudden changes in input voltage and output current. Finally, the circuitry of the invention solves the problem of providing a desirable current limiting characteristic and does so without interfering with the solutions to the remaining control problems.

It will be understood that the above described embodiments were described only to clearly convey the principles of the invention and to illustrate a few of the various circuits which may be utilized to realize these principles in tangible form, but that the true scope of the invention may be ascertained only from the appended claims.

What is claimed is:

1. A circuit for controlling a regulator circuit of the type which controls its output voltage and current by varying the control angle between an a-c input voltage wave and a control voltage wave comprising, in combination, a control oscillator having an input and an output and serving as means for generating at the output thereof a periodic two-state control signal having a period that varies in accordance with the net signal applied to the input thereof, means for generating a feedback signal that varies in accordance with a signal appearing at the output of the regulator circuit, means for applying the feedback signal to the input of the control oscillator, means for generating a damping signal that varies in accordance with the control angle, a-c coupling means for applying the damping signal to the input of the control oscillator, and means for connecting the output of the control oscillator to the regulator circuit to control the regulating activity thereof.

2. A control circuit as set forth in claim 1 in which the a-c coupling means includes a capacitor and in which the damping signal comprises a two-state signal the duty-cycle of which varies in accordance with the control angle.

3. A control circuit as set forth in claim 2 including means for applying a bias current to the input of the control oscillator, the change in damping signal current accompanying a change in the state of the damping signal being on the order of three to ten times the bias current.

4. A control circuit as set forth in claim 3 wherein changes in control angle are reflected substantially instantaneously by changes in the duty-cycle of the damping signal.

5. A control circuit as set forth in claim 1 in which the a-c coupling means includes a capacitor and in which the damping signal comprises a signal the average value of which varies in accordance with the control angle.

6. A control circuit as set forth in claim 1 in which the control oscillator includes: means for generating complementary signals that vary in accordance with the net signal at the input of the control oscillator, an integrating network, switching means having a first state in which one of the complementary signals is applied to the integrating network and a second state in which the other of the complementary signals is applied to the integrating network, positive comparing means for establishing a positive integrating limit for the integrating network, negative comparing means for establishing a negative integrating limit for the integrating network, a flip-flop, means for connecting the positive comparing means to one input of the flip-flop, means for connecting the negative comparing means to the other input of the flip-flop, means for connecting the flip-flop in switching control relationship to the switching means, and means for connecting the flip-flop to the output of the control oscillator.

7. A control circuit as set forth in claim 6 in which the a-c coupling means includes a capacitor and in which the damping signal comprises a two-state signal the duty-cycle of which varies in accordance with the control angle.

8. A control circuit as set forth in claim 7 including means for applying a bias current to the input of the control oscillator, the change in damping signal current accompanying a change in the state of the damping signal being on the order of three to ten times the bias current.

9. A control circuit as set forth in claim 8 wherein changes in control angle are reflected substantially instantaneously by changes in the duty-cycle of the damping signal.

10. A control circuit as set forth in claim 1 in which the feedback signal varies in accordance with the voltage at the output of the regulator circuit.

11. A control circuit as set forth in claim 1 in which the feedback signal varies in accordance with the current at the output of the regulator circuit.

12. A control circuit as set forth in claim 1 including a reference oscillator for generating a periodic two-state reference signal that is locked in phase with the voltage at the input of the regulator circuit, the control and reference oscillators being arranged so that when, under steady-state conditions, the output voltge and current of the regulator circuit are within rated limits, each transition of the control signal occurs after a normally preceeding transition of the reference signal and before a normally following transition of the reference signal, the control circuit further including phase limiting means for fixing the control angle of the regulator circuit in accordance with the control signal when each significant transition of the control signal occurs between the normally preceeding and the normally following significant transitions of the reference signal and for fixing the control angle of the regulator circuit in accordance with the reference signal when any significant transition of the control signal occurs either after the normally following significiant transition of the reference signal or before the normally preceeding significant transition of the reference signal.

13. A control circuit as set forth in claim 1 including a reference oscillator for generating a periodic two-state reference signal the transitions of which are locked in phase with voltage at the input of the regulator circuit, the reference and control oscillators being arranged so that when, under steady-state conditions, the output voltage and current of the regulator circuit are within rated limits, each significant transition of the control signal occurs within a respective angular reference window the width of which is related to the frequency of the voltage at the input of the regulator circuit, the control circuit further including phase limiting means for fixing the control angle of the regulator circuit in accordance with the control signal when the significant transitions thereof occur within respective angular reference windows and for fixing the control angle of regulator circuit in accordance with the reference signal when a significant transition of the control signal occurs outside of its respective angular reference window.

14. A circuit for controlling a regulator circuit of the type which controls its output voltage and current by varying the control angle between an a-c input voltage wave and a control voltage wave comprising, in combination, a control oscillator having an input and an output and serving as means for generating at the output thereof a periodic two-state control signal the period of which varies in accordance with the net signal at the input thereof, means for generating a feedback signal that varies in accordance with a signal at the output of the regulator circuit, means for applying the feedback signal to the input of the control oscillator, means for limiting the rate of change of the period of the periodic control signal, and means for applying the control signal to the regulator circuit to control the regulating activity thereof.

15. A control circuit as set forth in claim 14 in which the control oscillator includes: means for generating complementary signals that vary in accordance with the net signal at the input of the control oscillator, an integrating network, switching means having a first state in which one of the complementary signals is applied to the integrating network and a second state in which the other of the complementary signals is applied to the integrating network, positive comparing means for establishing a positive integrating limit for the integrating network, negative comparing means for establishing a negative integrating limit for the integrating network, a flip-flop, means for connecting the positive comparing means to one input of the flip-flop, means for connecting the negative comparing means to the other input of the flip-flop, means for connecting the flip-flop in switching control relationship to the switching means, and means for connecting the flip-flop to the output of the control oscillator.

16. A control circuit as set forth in claim 14 in which the feedback signal varies in accordance with the voltage at the output of the regulator circuit.

17. A control circuit as set forth in claim 14 in which the feedback signal varies in accordance with the current at the output of the regulator circuit.

18. A control circuit as set forth in claim 14 including a reference oscillator for generating a periodic, two-state reference signal that is locked in phase with the voltage at the input of the regulator circuit, the reference and control oscillators being arranged so that when, under steady-state conditions, the output voltage and current of the regulator circuit are within rated limits, each significant transition of the control signal occurs after a normally preceeding transition of the reference signal and before a normally following transition of the reference signal, said control circuit further including phase limiting means for fixing the control angle of the regulator circuit in accordance with the control signal when the transitions thereof appear between the normally preceeding and the normally following transitions of the reference signal and for fixing the control angle of the regulator circuit in accordance with the reference signal when a transition of the control signal occurs either after the normally following transition of the reference signal or before the normally preceeding transition of the reference signal.

19. A control circuit as set forth in claim 14 including a reference oscillator for generating a periodic, two-state reference signal the transitions of which are locked in phase with the voltage at the input of the regulator circuit, the reference and control oscillators being arranged so that when, under steady-state conditions, the output voltage and current of the regulator circuit are within rated limits, each significant transition of the control signal occurs within a respective angular reference window the width of which is related to the frequency of the voltage at the input of the regulator circuit, the control circuit further including phase limiting means for fixing the control angle of the regulator circuit in accordance with the control signal when each significant transition thereof occurs within its respective angular reference window and for fixing the control angle of the regulator circuit in accordance with the reference signal when any significant transition of the control signal occurs outside of its respective angular reference window.

20. A control circuit as set forth in claim 19 in which the means for limiting the rate of change of the period of the periodic control signal comprises means for distributing a necessary change in the control angle over at least two successive angular reference windows.

21. A circuit for controlling a regulator circuit of the type which controls its output voltage and current by varying the control angle between an a-c input voltage wave and a control voltage wave comprising, in combination, means for generating a reference pulse train that is locked in phase with the voltage at the input of the regulator circuit, means for generating a control pulse train that is locked in phase with a control voltage wave of the regulator circuit, means for generating a feedback signal that varies in accordance with the voltage at the output of the regulator circuit, means responsive to the feedback signal for adjusting the phase relationship of the reference and control pulse trains, means for generating a damping signal that varies in accordance with the control angle, means responsive to the damping signal for limiting the rate of change of the control angle, and means for applying the control pulse train to the regulator circuit to control the regulating activity thereof.

22. A control circuit as set forth in claim 21 further including means for preventing control pulses from occurring outside of the respective angular reference windows bounded by respective normally preceeding reference pulses and respective normally following reference pulses.

23. A control circuit as set forth in claim 21 including means for preventing the angle between the control pulse train and the reference pulse train from varying outside of predetermined angular limits.

24. A control circuit as set forth in claim 21 including means for preventing each control pulse from lagging the nearest preceeding reference pulse by an angle greater than 60° or less tha 0°.

25. A control circuit as set forth in claim 21 wherein the damping signal is a two-state signal the duty-cycle of which reflects the phase angle between the reference pulse train and the control pulse train on a substantially instantaneous basis.

26. A circuit for controlling a regulator circuit of the type which controls its output voltage and current by varying the control angle between an a-c input voltage wave and a control voltage wave comprising, in combination, means for generating a periodic reference pulse train that is locked in phase with the voltage at the input of the regulator circuit, means for generating a periodic control pulse train that is locked in phase with a control voltage wave of the regulator circuit, means for generating a feedback signal that varies in accordance with the voltage at the output of the regulator circuit, means for applying the feedback signal to the control pulse generating means to vary the angle between the reference and control pulse trains, means for limiting the rate of change of the period of the control pulse train and means for applying the control pulse train to the regulator circuit to control the regulating activity thereof.

27. A control circuit as set forth in claim 26 further including means for preventing any control pulse from occurring outside of the angular reference window bounded by the reference pulses which normally preceed and normally follow each control pulse.

28. A control circuit as set forth in claim 26 wherein the limiting means serves to spread a necessary change in the angle between the reference and control pulse trains over two or more successive control pulses.

29. A circuit for controlling a regulator circuit of the type which controls its output voltage and current by varying the control angle between an a-c input voltage wave and a control voltage wave comprising, in combination, a reference oscillator for generating a reference pulse train that is locked in phase with the voltage at the input of the regulator circuit, a control oscillator having an input and an output and serving as means for generating at the output thereof a control pulse train having a period that varies in accordance with the net signal at the input thereof, means for applying to the input of the control oscillator a feedback signal that varies in accordance with a signal at the output of the regulator circuit, each control pulse ordinarily occurring after a normally preceeding reference pulse and before a normally following reference pulse, and phase limiting means for fixing the control angle of the regulator circuit in accordance with the control pulse train when each control pulse occurs between the normally preceeding and the normally following reference pulses and for fixing the control angle of the regulator circuit in accordance with the reference pulse train when any control pulse occurs either after the normally following reference pulse or before the normally preceeding reference pulse.

30. A control circuit as set forth in claim 29, including means for restarting the control oscillator at approximately the beginning of its period when the phase limiting means fixes the control angle of the regulator circuit in accordance with a normally following reference pulse.

31. A control circuit as set forth in claim 30 wherein the restarting means comprises a speed-up switch connected to the input of the control oscillator.

32. A control circuit as set forth in claim 29 including means for suspending oscillatory activity in the control oscillator between the time that the control oscillator produces a control pulse and the time that the phase limiting means fixes the control angle of the regulator circuit in accordance with the normally preceeding reference pulse.

33. A control circuit as set forth in claim 32 wherein the suspending means comprises a hold switch connected to the input of the control oscillator.

34. A control circuit as set forth in claim 30 including means for suspending oscillatory activity in the control oscillator between the time that the control oscillator produces a control pulse and the time that the phase limiting means fixes the control angle of the regulator circuit in accordance with the normally preceeding reference pulse.

35. A control circuit as set forth in claim 34 wherein the restarting means comprises a speed-up switch connected to the input of the control oscillator and wherein the suspending means comprises a hold switch connected to the input of the control oscillator.

36. A circuit for controlling a regulator circuit of the type which controls its output voltage and current by varying the control angle betweeen an a-c input voltage wave and a control voltage wave comprising, in combination, a reference oscillator for generating a periodic reference signal the transitions of which are locked in phase with the voltage at the input of the regulator circuit, a control oscillator having an input and an output and serving as means for generating at the output thereof a periodic control signal the transitions of which occur at times that vary in accordance with the net signal applied to the input thereof, means for applying to the input of the control oscillator a feedback signal that varies in accordance with a signal at the output of the regulator circuit, each significant transition of the control signal ordinarily occurring within a respective angular reference window bounded by a predetermined number of degrees of lag behind the nearest preceeding significant transition of the reference signal, phase limiting means for fixing the control angle of the regulator circuit in accordance with the significant transitions of the control signal when each such transition occurs within its respective angular reference window and for fixing the control angle of the regulator circuit in accordance with the significant transitions of the reference signal when a significant transition of the control signal occurs outside of its respective angular reference window.

37. A control circuit as set forth in claim 36 including means for restarting the control oscillator at the beginning of its period when a significant transition of the control signal occurs after its respective angular reference window.

38. A control circuit as set forth in claim 36 including means for preventing the control oscillator from oscillating when a significant transition of the control signal occurs prior to its respective angular reference window.

39. A control circuit as set forth in claim 37 including means for preventing the control oscillator from oscillating when a significant transition of the control signal occurs prior to its respective angular reference window.

40. A circuit for controlling a regulator circuit of the type which controls its output voltage and current by varying the control angle between an a-c input voltage wave and a control voltage wave comprising, in combination, a reference oscillator for generating a periodic reference pulse train that is locked in phase with the voltage at the input of the regulator circuit, a control oscillator having an input and an output and serving as means for generating at the output thereof a periodic voltage control pulse train the repetition rate of which is determined by the net signal applied to the input thereof, means for applying to the input of the control oscillator aa feedback signal determined by the voltage at the output of the regulator circuit, pulse distributing means for controlling the phase position of the control wave in accordance with the times at which pulses are applied ot the input thereof, means for generating a phase difference signal that varies with the angle between the reference pulses and the pulses at the input of the pulse distributing means, phase limiting means for preventing the phase angle between the reference pulses and the pulses at the input of the pulse distributing means from exceeding predetermined angular limits, the phase limiting means having a first input for receiving the reference pulse train, a second input for receiving the voltage control pulse train and a third input for receiving the phase difference signal.

41. A control circuit as set forth in claim 40 including means for restarting the control oscillator at the beginning of its period when the voltage control pulse train lags the reference pulse train by an angle in excess of the predetermined angular limit.

42. A control circuit as set forth in claim 40 including means for preventing the control oscillator from oscillating when the voltage control pulse train leads the reference pulse train.

43. A control circuit as set forth in claim 41 including means for preventing the control oscillator from oscillating when the voltage control pulse train leads the reference pulse train.

44. A circuit for controlling a regulator circuit of the type which controls its output voltage and current by varying the control angle between an a-c input voltage wave and a control voltage wave comprising, in combination, a voltage control oscillator having an input and an output and serving as means for generating at the output thereof a periodic voltage control signal having a period that varies with the net signal applied to the input thereof, a current control oscillator having an input and an output and serving as means for generating at the output thereof a periodic current control signal having a period that varies with the net signal applied to the input thereof, voltage sensing means for applying to the input of the voltage control oscillator a signal that varies in accordance with the voltage at the output of the regulator circuit, current sensing means for applying to the input of the current control oscillator a signal that varies in accordance with the current at the output of the regulator circuit, OR-ing means responsive to the voltage and current control oscillators for generating an oscillator control signal in accordance with the voltage control signal when the period of the voltage control signal is shorter than the period of the current control signal and for generating an oscillator control signal in accordance with the current control signal when the period of the current control signal is shorter than the period of the voltage control signal, and means for applying the oscillator control signal to the regulator circuit.

45. A control circuit as set forth in claim 44 including means for restarting the current control oscillator when the voltage control oscillator produces its output signal before the current control oscillator produces its output signal and for restarting the voltage control oscillator when the current control oscillator produces its output signal before the voltage control oscillator produces its output signal.

46. A control circuit as set forth in claim 44 including means for limiting the rate of change of the period of the voltage control oscillator and means for limiting the rate of change of the period of the current control oscillator.

47. A control circuit as set forth in claim 44 including a reference oscillator for generating a periodic reference signal that is locked in phase with the voltage at the input of the regulator circuit, and phase limiting means for fixing the control angle in accordance with the oscillator control signal when the latter signal falls within predetermined angular limits of the reference signal and for fixing the control angle in accordance with the reference signal when the oscillator control signal does not fall within said angular limits.

48. A control circuit as set forth in claim 46 including a reference oscillator for generating a periodic reference signal that is locked into phase with the voltage at the input of the regulator circuit, and means for fixing the control angle in accordance with the oscillator control signal when the latter signal falls within predetermined angular limits of the reference signal and for fixing the control angle in accordance with the reference signal when the oscillator control signal does not fall within said predetermined angular limits.

49. A control circuit as set forth in claim 45 wherein the restarting means for the current oscillator includes a speed-up switch connected to the input of the current oscillator and to the OR-ing means and wherein the restarting means for the voltage oscillator includes a speed-up switch connected to the input of the voltage oscillator and to the OR-ing means.

50. A circuit for controlling a regulator circuit of the type which controls its output voltage and current by varying the control angle between an a-c input voltage wave and a control voltage wave comprising, in combination, a voltage control oscillator for generating a voltage control pulse train having a period that varies in accordance with the voltage at the output of the regulator circuit, a current control oscillator for generating a current control pulse train having a period that varies in accordance with the current at the output of the regulator circuit, and OR-ing means for applying a control pulse to the regulator circuit when, following the application of the last occurring control pulse thereto, a voltage control pulse occurs prior to a current control pulse, and for applying a control pulse to the regulator circuit when, following the application of the last occurring control pulse thereto, a current control pulse occurs prior to a voltage control pulse.

51. A control circuit as set forth in claim 50 including means for forcing the current oscillator into step with the voltage oscillator when a voltage control pulse occurs prior to a current control pulse and means for forcing the voltage oscillator into step with the current oscillator when a current control pulse occurs prior to a voltage control pulse.

52. A circuit for controlling a regulator circuit of the type which controls its output voltage and current by varying the control angle between an a-c input voltage wave and a control voltage wave comprising, in combination, a voltage control oscillator having an input and an output and serving as means for generating at the output thereof a periodic voltage control signal having a period that varies with the net signal applied to the input thereof, a current control oscillator having an input and an output and serving as means for generating at the output thereof a periodic current control signal having a period that varies with the net signal applied to the input thereof, voltage sensing means for applying to the input of the voltage control oscillator a signal that varies in accordance with the voltage at the output of the regulator circuit, current sensing means for applying to the input of the current control oscillator a signal that varies in accordance with the current at the output of the regulator circuit, pulse distributing means for controlling the phase position of the control wave in accordance with the times at which control signals are applied to the input thereof, and OR-ing means connected to the voltage and current control oscillators for energizing the input of the pulse distributing means in accordance with the control signal having the shorter period.

53. A control circuit as set forth in claim 52 including means for restarting the current control oscillator when the voltage control oscillator produces a control signal having a period shorter than that produced by the current control oscillator and for restarting the voltage control oscillator when the current control oscillator produces a control signal having a period shorter than that produced by the voltage control oscillator.

54. A control circuit as set forth in claim 52 including current damping means for limiting the rate of change of the period of the current control oscillator and voltage damping means for limiting the rate of change of the period of the voltage control oscillator.

55. A control circuit as set forth in claim 54 wherein the current damping means includes an a-c coupling network connected to the input of the current control oscillator, wherein the voltage damping means includes an a-c coupling network connected to the input of the voltage control oscillator and wherein both of the coupling networks are supplied with a damping signal having a duty-cycle proportional with the phase angle between the voltage at the input of the regulator circuit and the control wave.

56. A control circuit as set forth in claim 55 in which each control oscillator includes: means for generating complementary signals that vary in accordance with the net signal at the input of the oscillator, an integrating network, switching means having a first state in which one of the complementary signals is applied to the integrating network and a second state in which the other of the complementary signals is applied to the integrating network, positive comparing means for establishing a positive integrating limit for the integrating network, negative comparing means for establishing a negative integrating limit for the integrating network, a flip-flop, means for connecting the positive comparing means to one input of the flip-flop, means for connecting the negative comparing means to the other input of the flip-flop, means for connecting the flip-flop in switching control relationship to the switching means, and means for connecting the flip-flop to the output of the oscillator.

57. A control circuit as set forth in claim 52 including a reference oscillator for generating a reference signal that is locked in phase with the voltage at the input of the regulator circuit and means for preventing the angle between the signal at the input of the pulse distributing means and the reference signal from exceeding predetermined angular limits.

58. A control circuit as set forth in claim 57 including means for limiting the rate of change of the period of the current control oscillator and means for limiting the rate of change of the period of the current control oscillator.

59. A circuit for controlling a regulator circuit of the type which controls its output voltage and current by varying the control angle between an a-c input voltage wave and a control voltage wave comprising, in combination, a control oscillator having an input and an output and serving as means for generating at the output thereof a control pulse train having a period that varies with the net signal applied to the input thereof, voltage sensing means for establishing an analog voltage control signal that varies in accordance with the voltage at the output of the regulator circuit, current sensing means for establishing an analog current control signal that varies in accordance with the current at the output of the regulator circuit, OR-ing means for applying to the input of the control oscillator the analog control signal having the higher amplitude, pulse distributing means for controlling the phase position of the control wave in accordance with the times at which control signals are applied to the input thereof, and means for connecting the output of the control oscillator to the input of the pulse distributing means to control the regulating activity of the regulator circuit.

60. A control circuit as set forth in claim 59 including means for limiting the rate of change of the period of the control oscillator.

61. A control circuit as set forth in claim 59 wherein the OR-ing means comprised a pair of diodes connected to the input of the control oscillator.

62. A control circuit as set forth in claim 59 in which the control oscillator includes: means for generating complementary signals that vary in accordance with the net signal at the input of the control oscillator, an integrating network, switching means having a first state in which one of the complementary signals is applied to the integrating network and a second state in which the other of the complementary signals is applied to the integrating network, positive comparing means for establishing a positive integrating limit for the integrating network, negative comparing means for establishing a negative integrating limit for the integrating network, a flip-flop, means for connecting the positive comparing means to one input of the flip-flop, means for connecting the negative comparing means to the other input of the flip-flop, means for connecting the flip-flop in switching control relationship to the switching means, and means for connecting the flip-flop to the output of the control oscillator.

63. A control circuit as set forth in claim 62 including means for generating a two-state damping signal that substantially instantaneously reflects changes in the phase angle between the voltage at the input of the regulator circuit and the control voltage wave and a-c coupling means for applying the damping signal to the input of the control oscillator.

64. A control circuit as set forth in claim 59 including a reference oscillator for generating a reference pulse train the pulses of which are locked in phase with the voltage at the input of the regulator circuit and phase-limiting means for energizing the input of the pulse distributing means in accordance with the control pulse train when the angle between the control pulse train and the reference pulse train is within predetermined angular limits and for energizing the input of the pulse distributing means in accordance with the reference pulse train when the angle between the control pulse train and the reference pulse train is not within said predetermined angular limits.

65. A control circuit as set forth in claim 60 including a reference oscillator for generating a reference pulse train the pulses of which are locked in phase with the voltage at the input of the regulator circuit and phase-limiting means for energizing the input of the pulse distributing means in accordance with the control pulse train when the angle between the control pulse train and the reference pulse train is within predetermined angular limits and for energizing the input of the pulse distributing means in accordance with the reference pulse train when the angle between the control pulse train and the reference pulse train is not within said predetermined angular limits.

66. A control circuit as set forth in claim 64 including means for restarting the control oscillator at the beginning of its period when the input of the pulse distributing means is energized in accordance with the reference pulse train because a control pulse has occurred too late to fall within said predetermined angular limits.

67. A control circuit as set forth in claim 64 including means for suspending pulse generating activity in the control oscillator when a control pulse occurs too soon to fall within said predetermined angular limits.

68. A control circuit as set forth in claim 63 including means for applying a bias current to the input of the control oscillator, the change in current produced by a change of state in the damping signal being on the order of three to ten times the bias current.

69. A circuit for controlling a regulator circuit of the type which controls its output voltage and current by varying the control angle between an a-c input voltage wave and a control voltage wave comprising, in combination, reference pulse generating means for generating a reference pulse train that is locked in phase with the voltage at the input of the regulator circuit, voltage sensing means for generating a voltage feedback signal that varies in accordance with the voltage at the output of the regulator circuit, control pulse generating means for generating a control pulse train having a controllable period, means for connecting the voltage sensing means to the control pulse generating means to control the period thereof in accordance with the voltage feedback signal, pulse distributing means for fixing the phase position of the control wave in accordance with the times at which pulses are applied to the input thereof, phase limiting means for allowing control pulses to propagate from the control pulse generating means to the input of the pulse distributing means when the control pulse train bears a permissible phase relationship to the reference pulse train and for allowing reference pulses to propagate from the reference pulse generating means to the input of the pulse distributing means when the control pulse train does not bear a permissible phase relationship to the reference pulse train.

70. A control circuit as set forth in claim 69 including current sensing means for generating a current feedback signal that varies in accordance with the current at the output of the regulator circuit and means for connecting the current sensing means to control pulse generating means to control the period thereof in accordance with the current feedback signal.

71. A control circuit as set forth in claim 70 wherein the means for connecting the voltage and current sensing means to the control pulse generating means comprise respective diodes.

72. A control circuit as set forth in claiam 69 including means responsive to the control angle for limiting the rate of change of the period of the control pulse generating means.

73. A control circuit as set forth in claim 69 which includes means for generating a phase difference signal that is indicative of the control angle and in which the phase limiting means includes an input for receiving the control pulse train, an input for receiving the reference pulse train and an input for receiving the phase difference signal.

74. A control circuit as set forth in claim 73 wherein the phase difference signal is a two-state signal which assumes a first state between the times that reference pulses occur and the times that pulses appear at the input of the pulse distributing means and which assumes a second state between the times that pulses appear at the input of the pulse distributing means and the times that reference pulses occur.

75. A control circuit as set forth in claim 74 wherein the phase limiting means includes first switching means for allowing a control pulse to propagate from the control pulse generating means to the pulse distributing means when the phase difference signal is in the first state at the time that the control pulse generating means generates that control pulse, second switching means for allowing a reference pulse to propagate from the reference pulse generating means to the pulse distributing means when the phase difference signal is in the first state at the time that the reference pulse generating means generates that reference pulse, and third switching means for storing the fact that a control pulse has occurred when the phase difference signal is in the second state at the time that the control pulse generating means generates that control pulse and for applying a pulse to the pulse distributing means at the time of occurrence of the next occurring reference pulse.

76. A control circuit as set forth in claim 72 in which the limiting means includes means for generating a two-state damping signal the transitions of which are initiated by the reference pulse train and by the pulses appearing at the input of the pulse distributing means, and a-c coupling means for applying the damping signal to the control pulse generating means.

* * * * *